(12) United States Patent
Suda et al.

(10) Patent No.: US 6,578,019 B1
(45) Date of Patent: *Jun. 10, 2003

(54) INFORMATION PROCESSING SYSTEM WHICH UNDERSTANDS INFORMATION AND ACTS ACCORDINGLY AND METHOD THEREFOR

(75) Inventors: Aruna Rohra Suda, Yokohama (JP); Suresh Jeyachandran, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/551,850

(22) Filed: Nov. 7, 1995

(30) Foreign Application Priority Data

| Nov. 8, 1994 | (JP) | 6-273616 |
| Dec. 5, 1994 | (JP) | 6-300955 |
| Dec. 5, 1994 | (JP) | 6-300957 |

(51) Int. Cl.⁷ .......................... G06F 17/00
(52) U.S. Cl. .................. 706/15; 706/11; 706/46
(58) Field of Search ............... 395/10, 12, 51; 706/15, 11, 46

(56) References Cited

U.S. PATENT DOCUMENTS

| 4,736,296 A | | 4/1988 | Katayama et al. | 364/419 |
| 4,829,434 A | * | 5/1989 | Karmel et al. | 701/59 |
| 4,939,648 A | | 7/1990 | O'Neill et al. | 364/422 |
| 5,255,386 A | * | 10/1993 | Prager | 395/600 |
| 5,311,422 A | * | 5/1994 | Loftin et al. | 364/401 |
| 5,355,444 A | * | 10/1994 | Chirico | 706/45 |
| 5,389,050 A | * | 2/1995 | Sakai et al. | 701/57 |
| 5,490,089 A | * | 2/1996 | Smith et al. | 369/81 |

FOREIGN PATENT DOCUMENTS

| EP | 216480 A2 | 4/1987 | |
| EP | 401975 | 12/1990 | |
| EP | 436459 A1 | 7/1991 | |
| EP | 441089 A2 | 8/1991 | |
| EP | 499567 A2 | 8/1992 | |
| EP | 0 499 567 A2 | * 8/1992 | G06F/3/023 |
| EP | 524080 A2 | 1/1993 | |
| EP | 566228 A2 | 10/1993 | |
| EP | 692765 | 1/1996 | |
| WO | WO 92/02880 | * 2/1992 | G06F/15/00 |

OTHER PUBLICATIONS

Niehaus et al., "An Expert System for Automated Highway Driving," IEEE Control Systems Magazine, vol. 11, No. 3, pp. 53–61, Apr. 1991.*

(List continued on next page.)

Primary Examiner—George B. Davis
(74) Attorney, Agent, or Firm—Fitzpatrick, Cella, Harper & Scinto

(57) ABSTRACT

An information processing system which understands the input information as a situation, infers the requirements that situation merits and the preferred responses to those requirements using a knowledge base which has knowledge about the situations, requirements and their responses and the relations among them, and by generating these inferences further understands the input and the situation, which enables it to perform efficiently and effectively, given small amount of input information. If input information is in natural language, the linguistic knowledge base is used to analyze the input natural language information. Further, a knowledge of the user, the operations performed by the user and knowledge of the relationship between the operations of the user and the attribute of the user may also be used by the system to appropriately operate for each user.

27 Claims, 63 Drawing Sheets

OTHER PUBLICATIONS

Chande et al., "Intelligent Navigator for Automobiles," International Conference on Industrial Electronics, Control and Instrumentation (IECON), vol. 2, pp. 1115–1121, Nov. 1991.*

"Intelligent Help—The Results of the EUROHELP Project", M. Smith, et et al., ICL Technical Journal, vol. 7, No. 2, Nov. 1, 1990, pp. 328–361.

"Intelligent Assistance for Software Development and Maintenance", G. E. Kaiser, et al., I.E.E.E. Software, vol. 5, No. 3, May 1988, pp. 40–49.

"Learning by Doing with Simulated Intelligent Help", J. M. Carroll, et al., Communications of the Association for Computing Machinery, New York, NY, US, vol. 31, No. 9, Sep. 1988, pp. 1064–1079.

"An Expert System Interface for an Identification Program", J. E. Larsson, et al., Automatica, vol. 27, No. 6, Nov. 1991, pp. 919–930.

"Reason: An Intelligent User Assistant for Interactive Environments", J. M. Prager, et al., IBM Systems Journal, vol. 29, No. 1, Jan. 1, 1990, pp. 141–164.

"ISE: A User Modeling Based Software Development System", J. J. P. Tsai, et al., Proceedings of COMPSAC Software and Applications Conference (Cat. No. 87CH2447–1), Tokyo, Japan, Oct. 7–9, 1997, ISBN 0–8186–8806–8, 1987, Wash., D.C., USA, I.E.E.E. Comput. Soc. Press, USA, pp. 141–147.

"A Discourse–Based Consultant for Interactive Environments", U. Wolz, et al., Proceedings on the Conference on Artificial Intelligent Applications, San Diego, Mar. 16–18, 1988, No. 1988, Mar. 14, 1998, Institute of Electrical and Electronics Engineers, pp. 28–33.

"Advice–Giving Using REASON: An Intelligent Assistant for Computing", D.M. Lambert, et al., Proceedings on the Conference on Artificial Intelligence Applications, Miami Beach, Feb. 24–28, 1991, vol. 1, No. CONF. 7, Feb. 24, 1991, IEEE, pp. 428–434.

"NLH/E: A Natural Language Help System", W. Tichy, et al., Proceedings of the International Conference on Software Engineering, Pittsburgh, May 16–18, 1989, No. Conf. 11, Institute of Electrical and Electronics Engineers, pp. 364–374.

"A Criticism–Based Model for Cooperative Problem Solving", S. Rajeev, et al., Computing Systems in Engineering, vol. 4, No. 2–3, ISSN 0956–0521, pp. 201–210, Apr.–Jun. 1993.

"Knowledge–Level Modeling Based on TRSA Method", Proceedings TENCON '93 1993 IEEE Region 10 Conference on "Computer, Communication, Control and Power Engineering", Beijing, China, Pub.: ISBN 0–7803–1233–3, 1993, New York, NY USA, IEEE, pp. 675–679 vol. 2.

"Signal Processing and Data Fusion for Autonomous Undersea Vehicles", J. Izra, et al., Proceedings of the 6th International Symposium of Unmanned Untethered Submersible Technology, Jun. 12–14, 1989, Durharm, NH NH, USA, Publ.: 1989, Univ. New Hampshire, Durham, NH, USA, pp. 393–400.

* cited by examiner

FIG. 4

(a) If detected 'application of breaks'
then infer 'need to decelerate'

(b) If 'need to increase the distance from the car in front'
then infer 'need to reduce the speed of car' (='need to decelerate')

(c) If 'distance with respect to the car in the front is closing in'
then 'need to increase the distance from the car in front'

(d) If 'the car in the front is breaking'
then 'distance with respect to the car in the front is closing in'

(e) If 'need to decelerate'
then 'decelerating' and
if 'there is a car too close at back'
then 'switch on hazard sign & reduce speed as slowly as possible'
else 'decelerate by the required value'

(f) While decelerating.
If 'the car in front has started accelerating'
then 'distance with respect to front car is increasing'

If 'distance with respect to front car is increasing'
then 'the driver can abandon deceleration and start accelerating'

FIG. 5

SENDER DETAILS

Letter Front

| Aruna | | Rohra |
|---|---|---|
| (first name) | (middle name) | (family name) |

Canon Inc.

(Organization)

(Division)

FIG. 6

RECEIVER DETAILS

Letter To:

| | | John |
|---|---|---|
| (first name) | (middle name) | (family name) |

Duke (Organization)

(Division)

FIG. 7

|   S   |   D   |   B   |
|-------|-------|-------|
| John Smith |  | Rochester |
| ... |  | ... |
| John Blake |  | Wellington |
| ... |  | ... |

FIG. 9

1. Visit
2. Request Information
3. Attend Conference
4. Publish Papers
5. Thank

To select an option, press Index Number or use Cursor keys to move & press Return to select appropriate option

FIG. 10

1. Fix an appointment
2. Change appointment
3. Make arrangements for Visit

To select an option, press Index Number or use Cursor keys to move & press Return to select appropriate option

FIG. 11

Please Enter Details of Visit

Time : 07/ /1993   (DD/MM/YY)

Place : Duke University

Reason : discuss on LWS

Any other Requests : y   (y/n)

FIG. 12

1. Reserve accommodation
2. Request for pick up
3. Request for Information regarding how to reach
4. Other Requests To select an option, press Index Number or use Cursor keys to move & press Return to select appropriate option

FIG. 13

OUTPUT LETTER

April 10, 1993

Mr. John Smith
Professor
Department of Computer Science
Duke University
Durham, NC - 12432
USA Dear Mr. Smith, I am working on Cognitive Science.
I would like to meet you, if possible.
I shall be grateful if you can find some time for me on 7th May 93. Kindly reserve accommodation for me to stay in a suitable hotel.

Looking forward to hearing from you, yours sincerely, (Aruna Rohra)
Canon Research Center
5 - 1, Morinosato - Wakamiya,
Atsugi, 243 - 01
Japan

FIG. 14

INPUT : Reply to John's letter accepting to meet
on 10th May at 3 pm to discuss on PDA systems.

OUTPUT OF CA : C1

C1 - MTRANS                        (reply)

{

Actor : ? PERSON

Object : MTRANS → C2

...

}

C2 - MTRANS                        (accept)

{

Actor : ? PERSON

Object : MEET → C3

...

}

C3 - MEET                           (meet to discuss)

{

Actor          : ? PERSON

Object        : PERSON (John Smith)

IObj Reason   :MTRANS

{

Actor          : ? PERSON

Object        : (PDA Systems)

...

}

Time           : (on 10th May at 3pm)

SA211. SET_SCENE
- a) Find actors -
  - Sender = Aruna Rohra
  - Receiver = John Smith
  - Letter = Reply

- b) No previous Related context found in Database but context found in the input.

- c) Response expected from Sender.

- d) Can infer Receiver's letter from Input (i.e., from C3)

SB212. GOAL DETECTION
      C3 = MEET → S_DO, M_VISIT, ASK
      MEET → (MTRANS) → ASK
    SB213. MAKE INFERENCE (REFER TO FIG. 16)
    SB214. PLANNING FOR UNDERSTANDING (REFER TO FIG. 17)
    SB215. PLANNING FOR COMPLETION (REFER TO FIG. 18)

SB300. TEXT - PREPARATOR
    SB400. GENERATOR

- e) Construct Sender's Reply from input (i.e., C2)

For CD(s) in the previous letter.

- i) for S_MAINGOAL, [MTRANS (discuss on PDA systems)]
        1. Acceptable request

- ii) for S_MAINPLAN, [MEET (MVISIT)]
        1. Accept

- iii) for S)_PLAN     [AGREEMENT (e.g., after 8th May)]
        More specific value for TIME may be specified
        by the user → 10th May 3 pm SA212.  GOAL DETECTION
SA213.  MAKE INFERENCE
SA214.  PLANNING FOR UNDERSTANDING
SA215.  PLANNING FOR COMPLETION

SA300.  TEXT - PREPARATOR
SA400.  GENERATOR

FIG. 19

Output :

April 15, 1993

Dr. John Smith,

Professor

Department of Computer Science

Duke University

Durham, NC - 12432

USA

This is with reference to your letter dated April 1st.

I shall be glad to have an opportunity to meet you.

Looking forward to meeting you, yours sincerely, (Aruna Rohra)

Research Planning and Administration Division

5 - 1, Morinosato - Wakamiya,

Atsugi, 243 - 01

Japan

FIG. 20

INPUT : Reply to John's letter confirming the meeting time.
19th May at 3 pm. Also, request him to arrange for pickup.

OUTPUT OF CA : C1, C4

C1 - MTRANS                                     (reply)
        {
          Actor  : ? PERSON
          Object : MTRANS → C2
          ...
        }

C2 - MTRANS                                   (confirm)
        {
          Actor  : ? PERSON
          Object : MEET → C3
          ...
        }

C3 - MEET                                      (meet)
        {
          Actor  : ? PERSON
          Object : PERSON (John Smith)
          ...
          Time   : (on 19th May at 3pm)
        }

C4 - MTRANS
        {
          Object : ARRANGE
                {
                    Actor  : ? PERSON
                    Object : MEET {···}         (pickup)
                    ...
                }
        }

FIG. 21

SA211. SET _ SCENE
   a) Find actors -
      Sender   = Aruna Rohra
      Receiver = John Smith
      Letter   = Reply b) Previous Related context found in Database
      Found open context - visit after 10th May
      John's letter must be in reply to it c) Response expected from Receiver d) Retrieve Previous letter from Database :
      [Date     - 04/01/1993
      Intro     - WORK - CD
      Maingoal - MTRANS (discuss)
      Mainplan - MEET (M _VISIT)
      Body     - AGREEMENT (after 10th May)
      Close    - ]

e) Can infer Receiver's letter

UNDERSTANDER [B]
        CONSTRUCT REPLY
        For CD (s) in the previous letter.

i) for S _ MAINGOAL.   [MTRANS (discuss)]
       1. Acceptable request ii) for S _ MAINPLAN.   [MEET (M _VISIT)]
       1. Accept Note : i) & (ii) are inferred from  "... confirming the time. 19th May at
          3 pm" i.e., C2 & C3.

iii) for S _ PLAN        [AGERRMENT (after 10th May)]
       More specific value for TIME specified
         → 3.00pm, 19th May 1993
      (from " ... confirming the time, 19th May at 3 pm" i.e., C3
        SB212. GOAL DETECTION
        SB213. MAKE INFERENCE
        SB214. PLANNING FOR UNDERSTANDING
        SB215. PLANNING FOR COMPLETION

SB300. TEXT = PREPARATOR
        SB400. GENERATOR f) Can Construct Sender's letter
       CONSTRUCT REPLY
     get reply to CD (s) of the reconstructed letter
       +
     any other additional request
      (request for pick up from "Also, request him to arrange for pickup")

SA212. GOAL DETECTION
SA213. MAKE INFERENCE
SA214. PLANNING FOR UNDERSTANDING
SA215. PLANNING FOR COMPLETION

SA300. TEXT - PREPARATOR
SA400. GENERATOR

FIG. 22

Output :

April 22, 1993
Dr. John Smith
Professor
Department of Computer Science
Duke University
Durham, NC - 12432
USA Dear Dr. Smith, Thank you for your early reply to my request. I am very grateful to have this opportunity of seeing you personally.

I shall be looking forward to seeing you at 3 pm on 19th May 93.
Can you kindly arrange to pick me up ?

Once agein, looking forward to meeting you, yours sincerely, (Aruna Rohra)
Research Planning and Administration Division
5 - 1, Morinosato - Wakamiya,
Atsugi, 243 - 01
Japan

FIG. 23

INPUT : Reply to John's letter.

OUTPUT OF CA : C1
    C1 - MTRANS          (reply)
      {
        Actor : ? PERSON
        Object : LETTER (John)
        ...
    }

SA211. SET_SCENE
    a) Find actors -
        Sender    = Aruna Rohra
        Receiver  = John Smith
        Letter    = Reply b) Pervious Related context found in Database
        Found open context - visit after 10th May
        Verify from user if John's letter was in reply to it.

c) Response expected from Receiver d) Retrieve Previous letter from Database :
        [Date      - 04/01/1993
        Intro      - WORK - CD
        Maingoal   - MTRANS (discuss)
        Mainplan   - MEET (MVISIT)
        Body       - AGREEMENT (after 10th May)
        Close     - ]

e) Can infer Receiver's letter
       Since nothing has been specified in the input. the system
       is not able to infer the Receiver's letter, hence it asks
       the user to input the letter, for e. g. , by OCR INPUT FROM OCR
        This is with reference to your letter dated 1st April.
        I shall be glad to have an opportunity to meet you.

We can meet at my office at 3 pm on 19th May 93.
        Please let me know if this is suitable to you.

FIG. 24

RECONSTRUCT LETTER from John
   For CD (s) in the previous letter.
      a) for S_MAINGOAL,    [MTRANS (discuss)]
      1. Acceptable request b) for S_MAINPLAN,    [MEET (MVISIT)]
      1. Accept Note : (a) & (b) are inferred from "I shall be glad to have an opportunity to meet you".

c) for S_PLAN           [AGREEMENT (after 10th May)]
        More specific value for TIME
          → 3. 00 pm. 19th May 1993
      (from "We can meet at my office at 3 pm on 19th May 93")

SB212. GOAL DETECTION
      SB213. MAKE INFERENCE
      SB214. PLANNING FOR UNDERSTANDING
      SB215. PLANNING FOR COMPLETION

SB300. TEXT - PREPARATOR }   Reconstructed letter.
      SB400. GENERATOR           }   (only for verifying)

f) Can Construct Sender's letter

CONSTRUCT REPLY
       get reply to CD (s) of the reconstructed letter
          +
   any other additional requests (e.g., pick me up)

SA212. GOAL DETECTION
SA213. MAKE INFERENCE
SA214. PLANNING FOR UNDERSTANDING
SA215. PLANNING FOR COMPLETION

SA300. TEXT - PREPARATOR
SA400. GENERATOR

FIG. 25

Output :

April 22, 1993

Dr. John Smith
Professor
Department of Computer Science
Duke University
Durham. NC - 12432
USA Dear Dr. Smith, Thank you for your early reply to my request. I am very grateful to have this opportunity of seeing you personally.

I shall be looking forward to seeing you at 3 pm on 19th May 93.
Can you kindly arrange to pick me up ?

Once again. looking forward to meeting you, yours sincerely, (Aruna Rohra)
Research Planning and Administration Division
5 - 1, Morinosato - Wakamiya,
Atsugi. 243 - 01
Japan

FIG. 27 input - Change the size and font of the letter to bold and 12 point.

System Execution ...

PLAN 1:

Choose Menu Font by sequence CODE F and then choose Option 2 for making it bold, for making it 12 point choose Option 6 in the same menu.

PLAN 2 :

First make a block of the text to be changed and then using Option 6 (Change style) in the Block Menu.

FIG. 29

Natural Language help to a product (e.g., WordProcessor)

Input -

How can I change the size and font of the letter to bold and 12 point ?

Output -

Choose Menu Style by CODE S and then choose Option 1 for making it bold, for making it 12 point choose Menu Size by Code Z and then choose Option 2.

You can also do this by first making a block of the text you want to change and then using Option 6 (Change style) in the Block Menu. See help on Block menu for more details.

FIG. 30

Input - save this file in a separate directory under MEMO

CA [ this = current file (assume name given at the time of edit)
    separate = new ]

Understander

- select name of new directory from some rule (either MEMO1 or filename)
- Complete planning → Actual execution of Copy command Output
    Saved it under MEMO. MEMO1

Continued input
    make it confidential

Understander
    (command) set protect = __

FIG. 32 a) Copying Machine

Input - make 5 copies of this reduced to A4.
        CA [this = current document]

Understander
  Scanner
    - detect the current size of the paper (e.g., A3, B4)
    - select the appropriate input tray (A4)
    - set the appropriate settings for reduction
      e.g., if A3 to A4 then 70% or
        if B4 to A4 then 81% etc.
    - Also, warn the user that the output will be actually
      in A4R and ask him whether it is ok.
    - Complete planning → Actual execution of above commands Output
    Made five copies in A4.

b) Fax

Input - send this to Mr. Smith and it is not urgent
      CA [this = current document]

Understander
    - find out the relevant person from the Database
    - since the fax is not to be sent urgently, the
      machine can scan & file it and send it later in
      night, thus not only saving the cost of transmission
      in some countries but also keeping the line free
      for incoming fax (s).
    - if the line of Mr. Smith happens to be busy then
      it can retry to send it after some time.
    - Complete planning → Actual execution of above commands Continued input
    Have you sent the fax to Mr. Smith ?
    Has he replied ?

Understander
    - check whether the fax had been sent & report the
      status & time to the User.
    - check whether there has been reply from Mr. Smith
      and inform the User (with the help of OCR or appropriate
      pattern matching function, in case of software program
      receiving fax).
    - Complete planning -> Tell the User the status of the above.

FIG. 33

Input - check whether Smith's address is still Rochester,
    if yes, change it to Duke System - find Smith in database
    if not unique,
            find the one with address as Rochester
            - confirm with user that he means that if found - remove that address
        before replacing search global database for
        complete name and address of Duke
            - prob. Duke University
            - confirm with user that he means that
        add new address to John if not found, check if there is one with
            address at Duke
        if yes - show that to user
            - confirm he means that person and do nothing else (if neither found)
            - show all entries of Smith to user
                (can neither find one at Rochester nor Duke)
            - which one do you mean ?
            - change that one to Duke.

else if nothing found
            - no entry for Smith
            - Shall I make a new one ?

FIG. 34

Input - write to John smith at the Institute of Optics,
Univ. of Rochester, Rochester, NY Pre - Understander
                Inferred
                    Orgn -    Institute of Optics
                                     |
                                     University of Rochester
                Address :
                                  Rochester (City)
                                  NY        (State)

(while making a new database entry)
   Question → Is that the complete address ?
   Input      - no. But it should be sufficient.
                 Just add the ZIP code NY 23452.

[add - ZIP code & store the complete entry in database]

Continue with letter writing

FIG. 35

Input - write to person incharge at ABC for purchase of their new PC's.

System - I assume you meant ABC Japan, Ueno since they are
handling sales - shall we write to them ?

Input - yes.

System -

Letter comes out to General Manager,
                  Marketing Division,
                  ABC Japan, Ueno, Japan

FIG. 36

| Organization | Country | Functions |
|---|---|---|
| ABC, MA | USA (Headquarters) | Sales |
| ABC, NJ | USA | R & D |
| ... | | |
| ABC Japan, Ueno | Japan | Sales |
| ABC Japan, Fukuoka | Japan | Sales |
| ABC Japan, Yamoto | Japan | R & D |
| ... | | |

FIG. 38

Natural Language help to GUI (Beginner)

Status - In Roman input mode.

Input - How can I change the input mode to enter in Katakana ?

Output -

1. Choose Menu 'Input' by clicking the mouse on the 'Input' symbol on the top menu bar. In the pull down window, select the Japanese Front End Processor (FEP).
2. Choose Menu 'Pen' by clicking the mouse on the 'Pen' symbol on the top right. In the pull down window, select Option for 'Katakana' input.

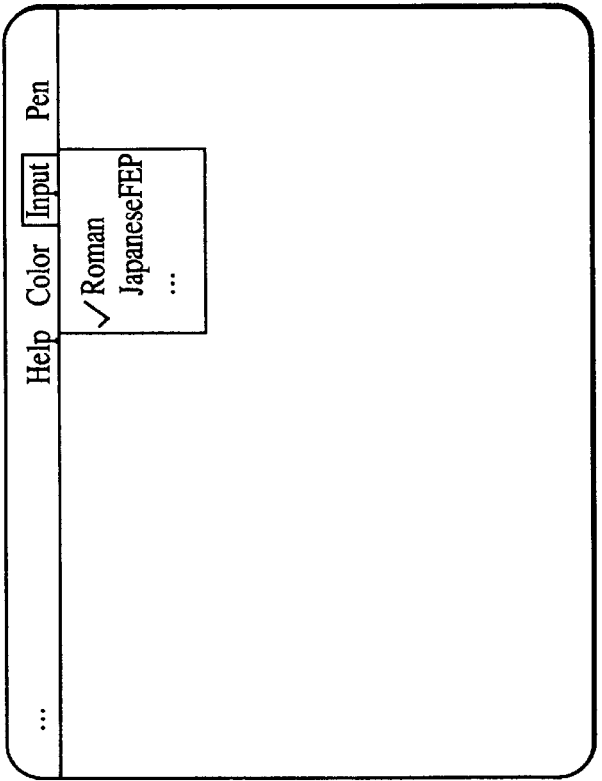

Step 1 :

Step 2 :

Natural Language help to GUI (Beginner)

Status - In Japanese (Hiragana) input mode.

Input - How can I change the input mode to enter in Katakana ?

Output -

1. Choose Menu 'Pen' by clicking the mouse on the 'Pen' symbol on the top right.
   In the pull down window, select Option for 'Katakana' input.

Step 1 :

FIG. 40

Natural Language help to GUI (Mid - level User)

Status - In Roman input mode.

Input - How can I change the input mode to enter in Katakana ?

Output -

1. First Change to 'Japanese' mode by the command Shift + Spacebar.

2. Choose Menu 'Pen' by clicking the mouse on the 'Pen' symbol on the top right. In the pull down window, select Option for 'Panel'; which will result in a panel as shown in the figure below. You can choose click on 'ア' for Katakana, 'あ' for Hiragana & 'A' for Roman.

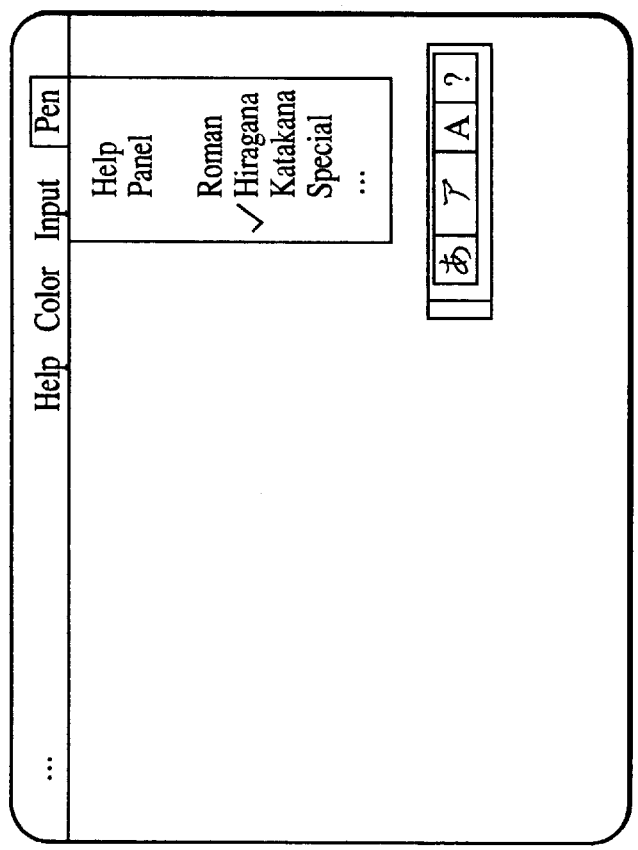

Step 1 :

FIG. 41

Natural Language help to GUI (Mid - level User)

Status - In Japanese input mode but no Panel on Screen.

Input - How can I change the input mode to enter in Katakana ?

Output -

1. Choose Menu 'Pen' by clicking the mouse on the 'Pen' symbol on the top right. In the pull down window, select Option for 'Panel'; which will result in a panel as shown in the figure below. You can choose click on 'ア' for Katakana, 'あ' for Hiragana & 'A' for Roman. The Panel will remain on the screen always in Japanese mode, making it convenient to you to change to different modes of input, by clicking the appropriate block.

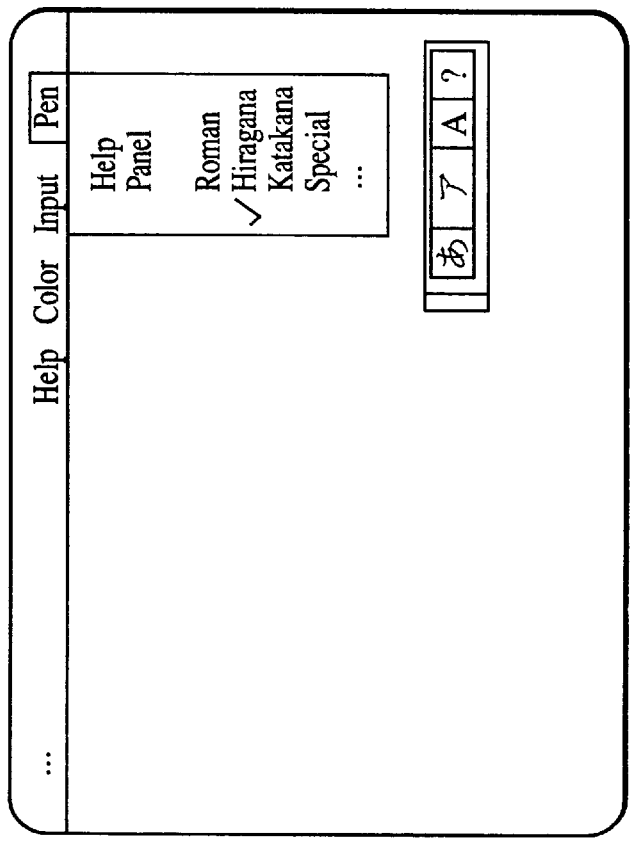

Step 1 :

FIG. 51

Interaction with Agents/Operables
    Attributes :
        Expertise level
        Interest Level
        Purpose
        Time limitations
        Style
        Mood
        Functionality
        Current Functionality
        ...
List of tasks to do
Tasks done (History of Operations)
Goals/Plans
...

FIG. 53

If <Basic Concepts> in query
then the user must be Beginner

If <Intermediate Concepts> in query
then the user must be Mid - level

If <Advanced Concepts> in query
then the user must be Advanced

Basic Concepts
    File, Directory,...
    Edit, Save, Input/Output

Intermediate Concepts
    Memory allocation,...

Advanced Concepts
    Random Access Files, Binary files,...
    Low level file handling
    System functions

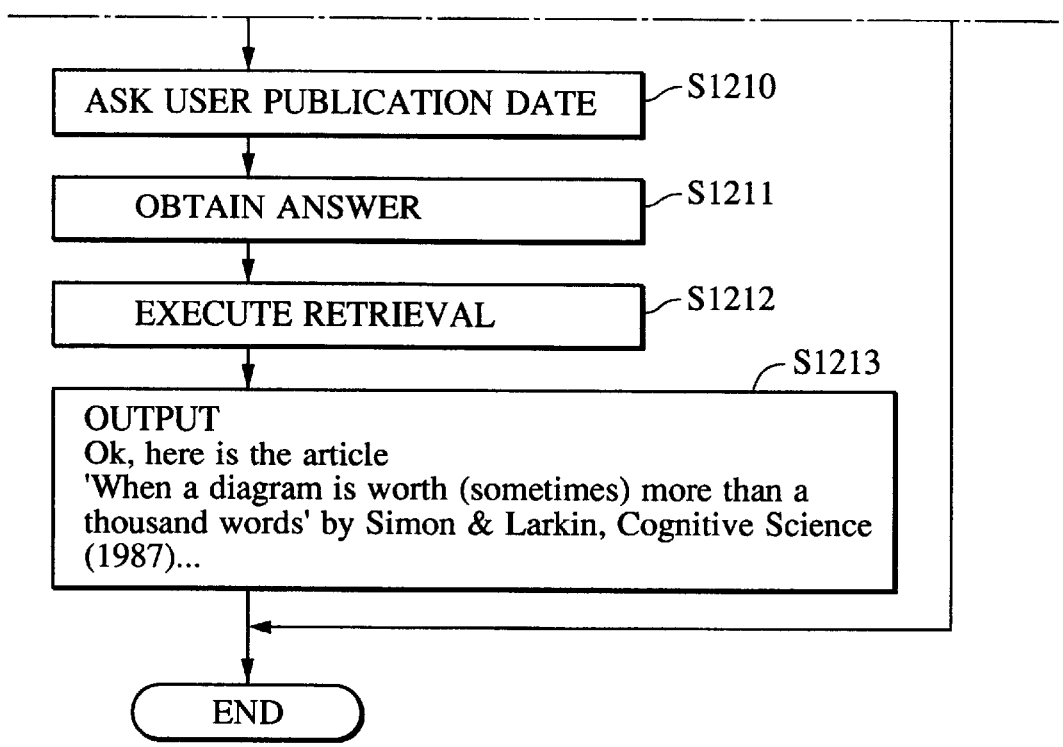

FIG. 61

(1) User1 : Is there a possibility/function to write something to a file ?
System :
[Infer from above that the User1 is Naive]
Output :
You can, but first you will have to open the file using the command 'fopen', then you can write to it using 'fprintf' which is similar to 'printf' and close the file using 'fclose'. A small sample part of the program is as follows :

```
FILE * fp :
if ((fp = fopen ("abc", "w")) = = NULL) {
    printf ("Could not open file abc¥n") ; exit (-1) ;
    }
    fprintf (fp, "the stuff you want to write") ;
    fclose (fp) ;
```

The file will be created if it does not exist and if you would like to append to an existing file, use "a" instead of "w" in fopen.

(2) User1 : What was the command for opening a file ?
System : [Recollect from history the help provided last time and infer that he needs only the syntax]
Output : FILE * fopen (char * filename, char * mode)
mode = "w" for writing
     = "a" for appending
     = "r" for reading

FIG. 62

User2 : How do I write binary data to a file and how do I do a random access on the data ?

System :
    [Infer from above that the User is not naive]

Output :
    You can use fopen with mode as "b"
    FILE * fopen (char * filename, char * mode)
        mode = "wb" for writing, "rb" for reading,
        and so on ﹍
    and use fseek (fp, int offset, int mode)
        where mode = CURRENT (from current)
        BEGINNING (from beginning of file)
        END (from end of file)
    use fwrite (fp, int recordno, char * record)

(OR)

You could also use lower level file handling functions which are faster.
        int fd = open (char * file, int mode)
            where mode = RDWR, WRONLY, RDONLY﹍
        Note : file should exist, use create (file, mode) if it does not exist.
            int no = write (int fd, char * something, int no. of bytes)
            where no is the number of bytes written, - 1 on error
                and seek (fd, offset, mode) where mode same as above
            ...

INFORMATION PROCESSING SYSTEM WHICH UNDERSTANDS INFORMATION AND ACTS ACCORDINGLY AND METHOD THEREFOR

BACKGROUND OF THE INVENTION

1. Field of the Invention

The present invention relates to a system for processing input information or controlling execution of a process in accordance with the environment around the system and/or the attributes of user and a method therefor.

2. Related Background Art

Hitherto, a system has been known which interprets input in a natural language to infer a goal or an intention of a user from the input. To realize a system of the foregoing type, the system must have a natural language parser (analyzer) for converting a natural language, such as English, into a computer expression and a mechanism, which uses a knowledge base formed by making a goal and a plan for achieving the goal to correspond to each other to infer a goal behind input.

Another system is available in which input in a natural language cannot be processed but which performs a predetermined process in accordance with commands, a menu or the like.

In the conventional natural language processing system, input in a natural language is converted into a computer expression and the goal behind that input is inferred using a knowledge base which has the knowledge of goals and plans. However, it has not been applied to predict the results of a possible plan, especially its undesirable effects.

In a system employing an input method which does not use the natural language, a command is interpreted to a limited meaning defined with respect to the command. Therefore, the intention of the command is not considered. Moreover, an erroneous input occurring due to a mistake in the operation by a user is not normally taken into account in the foregoing system.

Hitherto, a system is available in which a user is able to determine the level of the operational environment, such as whether help information, guidance information or the like from the system is provided, is determined by a user in accordance with his expertise with respect to the system or the complexity of the task to be performed in the system.

There has been another system in which a list of previously input commands is stored to which a reference can be made by a user or which enables a user to again execute the stored command.

However, the foregoing conventional systems require a user to determine and change the level of the operational environment by operating buttons or inputting commands.

Moreover, simple provision of the help information causes the help information having the same contents to be given to the user regardless of the expertise level of the user. Therefore, a skilled user is given unnecessarily detailed information, while the provided contents are too difficult for a beginner to be understood. Thus, the foregoing systems are unsatisfactory for the both types of users.

The conventional systems require a user to perform a complicated process to make a reference to the command list or again perform a command, thus requiring the user to be skilled in the procedure.

SUMMARY OF THE INVENTION

Accordingly, an object of the present invention is to provide an information processing system capable of executing a process corresponding to input information and suitable to the situation and a method therefor.

Another object of the present invention is to provide an information processing system capable of controlling execution of a process in accordance with the attribute of a user and a method therefor.

Another object of the present invention is to provide an information processing system which makes a plan to meet a requirement from a user and which is capable of predicting a result of execution of the plan and a method therefor.

According to one aspect, the present invention which achieves these objectives relates to an information processing system comprising: inputting means for inputting information; a knowledge base having knowledge of the relationship among situations, requirements corresponding to the situations and responses corresponding to the requirements; inference means which retrieves the knowledge base in accordance with the information input by the inputting means to infer a requirement corresponding to the information and the situation; and outputting means for outputting the requirement inferred by the inference means.

According to another aspect, the present invention which achieves these objectives relates to an information processing system comprising: inputting means for inputting information; a knowledge base having knowledge of the relationship among a situation, a requirement, a response corresponding to the requirement, a plan corresponding to the requirement and a result of execution of a process; requirement inference means which retrieves the knowledge base in accordance with the information input by the inputting means to infer a requirement corresponding to the information; plan construction means for constructing a plan corresponding to the requirement; and predicting means for predicting a result of execution of the plan by performing a simulation of the plan made by the plan construction means.

According to still another aspect, the present invention which achieves these objectives relates to an information processing system comprising: inputting means for inputting a command from a user; history storage means for storing input information performed by the inputting means; a knowledge base having knowledge of commands; inference means which infers the possible next-command to be input next by the inputting means the knowledge base in accordance with the information stored in the history storage means; and outputting means for outputting the possible commands inferred by the inference means.

According to another aspect, the present invention which achieves these objectives relates to an information processing system comprising: inputting means for inputting information from a user; a knowledge base having knowledge of the attributes of each user, on the basis of the knowledge retrieved from requirements corresponding to the attributes of the users and responses corresponding to the requirements; inference means which retrieves the knowledge base in accordance with the information input by the inputting means and the attribute of the user, the information of which has been input, so as to infer a requirement which corresponds to the information and the attribute of the user; and output means for outputting the requirement inferred by the inference means.

According to another aspect, the present invention which achieves these objectives relates to an information processing system comprising: natural language inputting means for inputting information in a natural language; a linguistic knowledge base having knowledge of languages; a global knowledge base having knowledge of common sense; analyzing means for analyzing, by using the linguistic knowledge base, the natural language information input by the natural language inputting means; a situation knowledge base having knowledge of the relationship among situations, requirements corresponding to the situations and responses corresponding to the requirements; requirement inference means which retrieves the situation knowledge base in accordance with the result of analysis performed by the analyzing means to infer a requirement corresponding to the natural language information; and outputting means for outputting the requirement inferred by the requirement inference means.

According to another aspect, the present invention which achieves these objectives relates to an execution control system comprising: operation means which is operated by a user; executing means for executing a process in accordance with the operation performed by the operation means; a knowledge base having knowledge of operations to be performed by the operation means and the relationship among the operations and the attributes of the user; inference means for inferring the attribute of the user in accordance with the knowledge in the knowledge base; and control means for controlling execution to be performed by the executing means in accordance with the attributes of the user inferred by the inference means.

According to another aspect, the present invention which achieves these objectives relates to an execution control system comprising: operation means to be operated by a user; executing means for executing a process in accordance with the operation performed by the operation means; history storage means for storing history of operations performed by the operation means; and control means for controlling execution of the process by the execution means in accordance with the history of the operations stored in the history storage means.

According to another aspect, the present invention which achieves these objectives relates to an execution control system comprising: operation means to be operated by a user; executing means for executing a process in accordance with the operation performed by the operation means; history storage means for storing history of operations performed by the operation means; a knowledge base having knowledge of the operations of the operation means and the relationship between the operations and the attributes of the user; inference means for inferring the attribute of the user in accordance with the history of the operations stored in the history storage means and the knowledge in the knowledge base; and control means for controlling execution of the process by the executing means in accordance with the attributes of the user inferred by the inference means.

According to another aspect, the present invention which achieves these objectives relates to an information processing method comprising the steps of: an inputting step for inputting information; an inference step which retrieves a knowledge base having knowledge of situations, requirements corresponding to the situations and the relationship between the requirements and responses in accordance with the information input in the inputting step to infer a requirement corresponding to the information and the situation; and an outputting step for outputting a requirement inferred in the inference step.

According to another aspect, the present invention which achieves these objectives relates to an information processing method comprising the steps of: an inputting step for inputting information; a requirement inference step for retrieving, in accordance with the information input in the inputting step, a knowledge base having knowledge of the relationship among situations, requirements, responses corresponding to the requirements, plans corresponding to the requirements so as to infer a requirement corresponding to the information; a making means for making a plan corresponding to the requirement; and a predicting step for predicting a result of execution of the plan by performing a simulation of the plan made in the making step.

According to another aspect, the present invention which achieves these objectives relates to an information processing method comprising the steps of: an inputting step for inputting a command from a u a history storage step for storing information of history of inputs performed in the inputting step; an inference step in which a reference is made to a knowledge base having knowledge of commands in accordance with the information of history stored in the history storage step to infer possible commands to be next input in the inputting step; and an outputting step for outputting the possible commands inferred in the inference step.

According to another aspect, the present invention which achieves these objectives relates to an information processing method comprising the steps of: an inputting step for inputting information from a user; an inference step for retrieving a knowledge base having knowledge of the relationship among the attribute of each user, requirements corresponding to the attributes of the users and responses corresponding to the requirements in accordance with the input information in the inputting step and the attribute of the user, who has input the information so as to infer a requirement which corresponds to the information and the attribute of the user; and an outputting step for outputting a requirement inferred in the inference step.

According to another aspect, the present invention which achieves these objectives relates to an information processing method comprising the steps of: a natural language inputting step for inputting information in a natural language; an analyzing step for analyzing the natural language information input in the natural language inputting step by using a linguistic knowledge base having knowledge of languages and a global knowledge bass having knowledge of common sense; a requirement inference step for retrieving the situation knowledge base having knowledge of the relationship among situations, requirements corresponding to the situations and responses corresponding to the requirements to infer a requirement corresponding to the natural language information; and an outputting step for outputting the requirement inferred in the requirement inference step.

According to another aspect, the present invention which achieves these objectives relates to an execution control method comprising the steps of: an executing step for executing a process in accordance with the operation of an operation portion performed by a user; a knowledge base having knowledge of operations of the operation portion and knowledge of the relationship between the operations and the attributes of users; an inference step for inferring the attributes of the user in accordance with the knowledge of the knowledge base; and a control step for controlling execution of a process to be performed by the executing step in accordance with the attributes of the user inferred in the inference step.

According to another aspect, the present invention which achieves these objectives relates to an execution control method comprising the steps of: an operation step in which an operation is performed by a user; an executing step for executing a process in accordance with the operation performed in the operating step; a history storage step for storing history of the operations performed in the operating step; and a control step for controlling execution of the process in accordance with the history of the operations stored in the history storage step.

According to another aspect, the present invention which achieves these objectives relates to an execution control method comprising the steps of: an operation step in which an operation is performed by a user; an executing step for executing a process in accordance with the operation performed in the operating step; a history storage step for storing history of the operations performed in the operating step; a knowledge base having knowledge of the operations to be performed in the operation step and knowledge of the relationship between the operations and the attributes of the user; an inference step for inferring the attributes of the user in accordance with the history stored in the history storage step and the knowledge of the knowledge base; and a control step for controlling execution in the executing step in accordance with the attribute of the user inferred in the inference step.

Other objectives and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 4 shows an example of a rule base;

FIG. 5 shows an example of a menu for inputting name of a sender;

FIG. 6 shows an example of a menu for inputting name of a receiver;

FIG. 7 shows an example of a person's data base;

FIG. 9 shows an example of a menu for inputting the purpose of a letter;

FIG. 10 shows an example of a menu for inputting a sub-goal;

FIG. 11 shows an example of a menu for inputting detailed information about a visit;

FIG. 12 shows an example of a menu for inputting additional requests;

FIG. 13 shows an example of a letter to be output;

FIG. 14 shows an example of a process to be performed by a CA in the process of writing a letter;

FIG. 15 shows a process for writing a letter;

FIG. 19 shows an example of output of a letter;

FIG. 20 shows an example of a process to be performed by the CA in the process of writing a letter;

FIG. 21 shows a process for writing a letter;

FIG. 22 shows an example of output of a letter;

FIG. 23 shows an example of a process to be performed by the CA in the process of writing a letter;

FIG. 24 shows a process for re-constructing a letter;

FIG. 25 shows an example of output of a letter;

FIG. 27 shows an example of a plan to be executed;

FIG. 29 shows an example of input and output of help information;

FIG. 30 shows an example of input and output corresponding to a natural language interface;

FIG. 32 shows an example of input and output corresponding to a natural language interface of an OA machine;

FIG. 33 shows an example of input and a process of maintenance of the data base;

FIG. 34 shows an example of input and a process of maintenance of the data base;

FIG. 35 shows an example of a process for supplementing a user command by the system;

FIG. 36 shows an example of the structure of the data base;

FIG. 38 shows an example of input and output when an input mode is changed;

FIG. 40 shows an example of input and output when an input mode is changed;

FIG. 41 shows an example of input and output when an input mode is changed;

FIG. 51 shows an example of a model of a user;

FIG. 53 shows example of a domain rule base;

FIG. 54 shows an example of a domain knowledge base;

FIGS. 57A and 57B are flow charts for processing a query from a user;

FIG. 61 shows an example of a response to a query from a user; and

FIG. 62 shows an example of a response to a query from a user.

DESCRIPTION OF THE PREFERRED EMBODIMENTS

Figure 1:
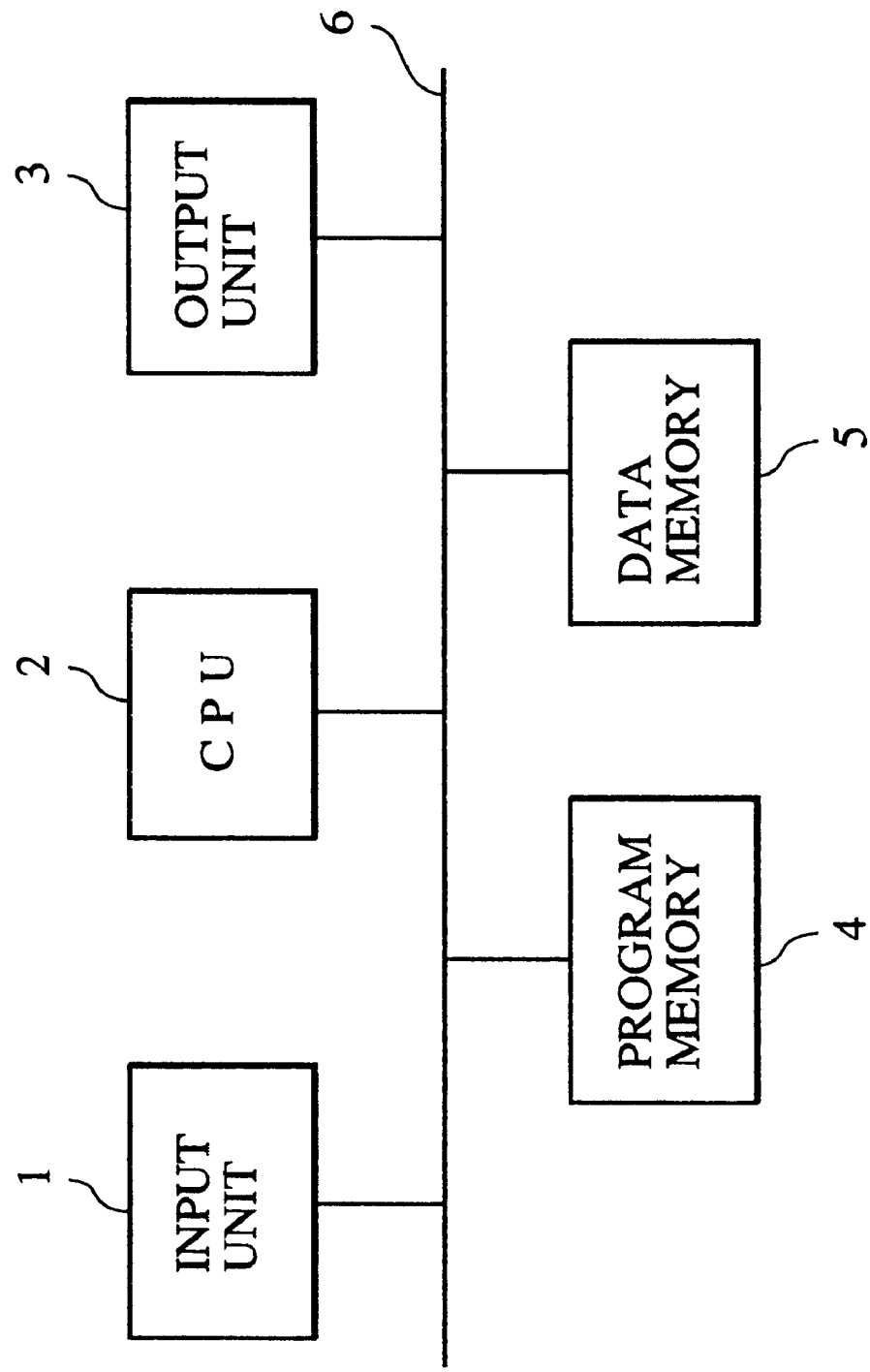
FIG. 1 is a block diagram showing the hardware components of an information processing system according to an embodiment of the present invention.

Referring to the drawings, embodiments of the present invention will now be described.

Referring to the drawings, a first embodiment of the present invention will now be described.

FIG. 1 is a block diagram showing the components of the hardware of a document processing apparatus according to the first embodiment of the present invention and comprises of an input unit 1, a CPU 2, an output unit 3, a program memory 4, a data memory 5 and a bus 6.

Referring to FIG. 1. the input unit 1 is a unit for inputting information, for example, a keyboard for inputting characters or selection commands by the keys thereon. The input unit 1 is not limited to this but the same may be a mouse for indicating the portion on a display frame, a voice input apparatus including a voice recognizing apparatus, an image input apparatus including a character recognizing apparatus or a receiver for receiving information from another apparatus or their combination which enables selection. Moreover, information created in another process in the document processing apparatus according to the present invention may be input.

The CPU 2 calculates data for use in a variety of processes and performs logical judgments to control the components connected to the bus 6.

The output unit 3 has a display unit, such as a CRT or a liquid crystal display unit or another apparatus, such as a voice output apparatus, which synthesizes information to output it as voice, a printer for printing out information, or a transmission apparatus for transmitting information to another apparatus or their combination to enable selective use. Moreover, the output from the output unit 3 may be input for another process to be performed in the apparatus according to this embodiment.

The program memory 4 is a memory for storing programs including a processing procedure in accordance with flow charts with which the CPU 2 controls the operation of the apparatus according to this embodiment. The program memory 4 may be a ROM or a RAM into which a program is loaded from an external storage apparatus.

The data memory 5 stores data formed in a variety of processes and stores knowledge in a knowledge base to be described later. The data memory 5 is, for example, a RAM including a knowledge base which must be previously loaded prior to performing the process from a nonvolatile external storage medium or to which reference is made as the need arises.

The bus 6 transfers an address signal for indicating a component to be controlled by the CPU 2, control signals for controlling the components and data to be communicated between the components.

Figure 2:
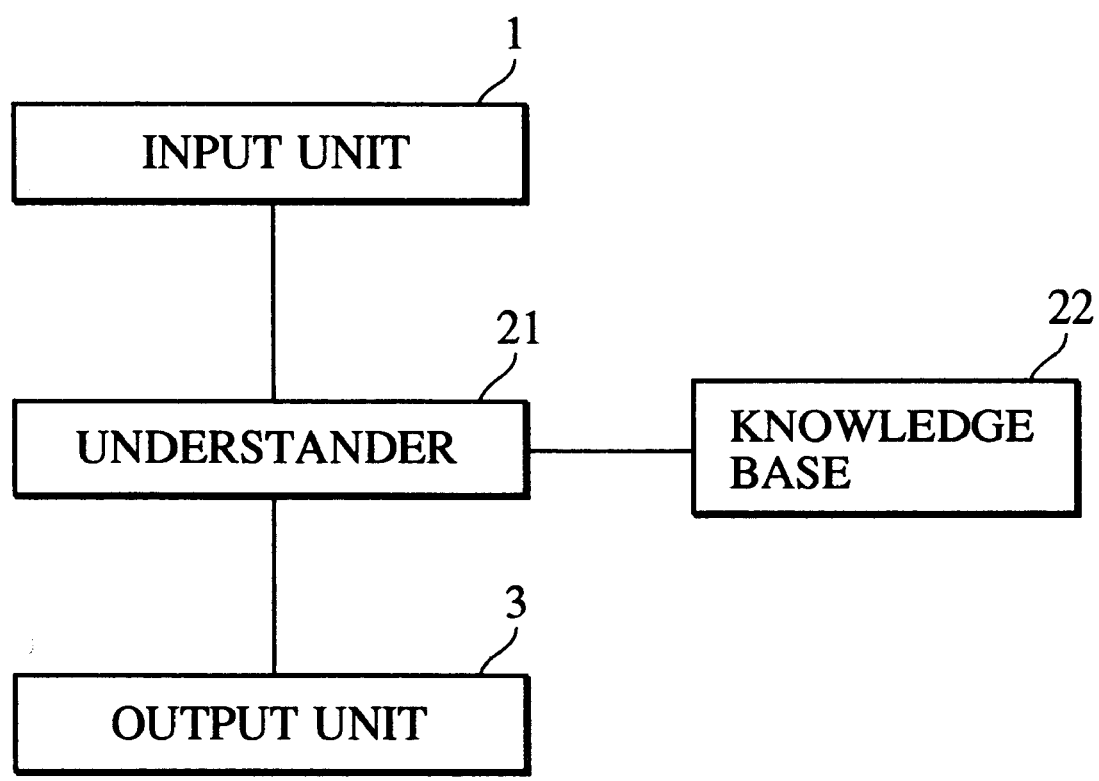
FIG. 2 is a block diagram showing the basic functions of the information processing system.

FIG. 2 is a basic function block diagram showing an information processing apparatus according to an embodiment of the present invention.

Referring to FIG. 2, commands from a user, the state of the apparatus, and information about the environment of the apparatus are supplied from the input unit 1. An understander 21 makes a reference to the knowledge base 22 in accordance with information supplied from the input unit 1 to understand input information and current situation to generate required information to be output. The knowledge base 22 is a knowledge base having knowledge, such as causes, results and the like. Information generated by the understander 21 is transmitted to the output unit 3 to be output to a user or a predetermined apparatus.

As an example in which an apparatus is operated in accordance with commands, the control of a car will now be described.

In this embodiment, the environmental condition around the car, such as the operational states of an accelerator, brake, and a steering wheel of the user's car, existence of other car in front and rear of the user's car and the distance between two cars are detected by sensors and the detected results are input. As outputs, control information for controlling deceleration, acceleration, turning of a head light on and the like is transmitted.

Figure 3:
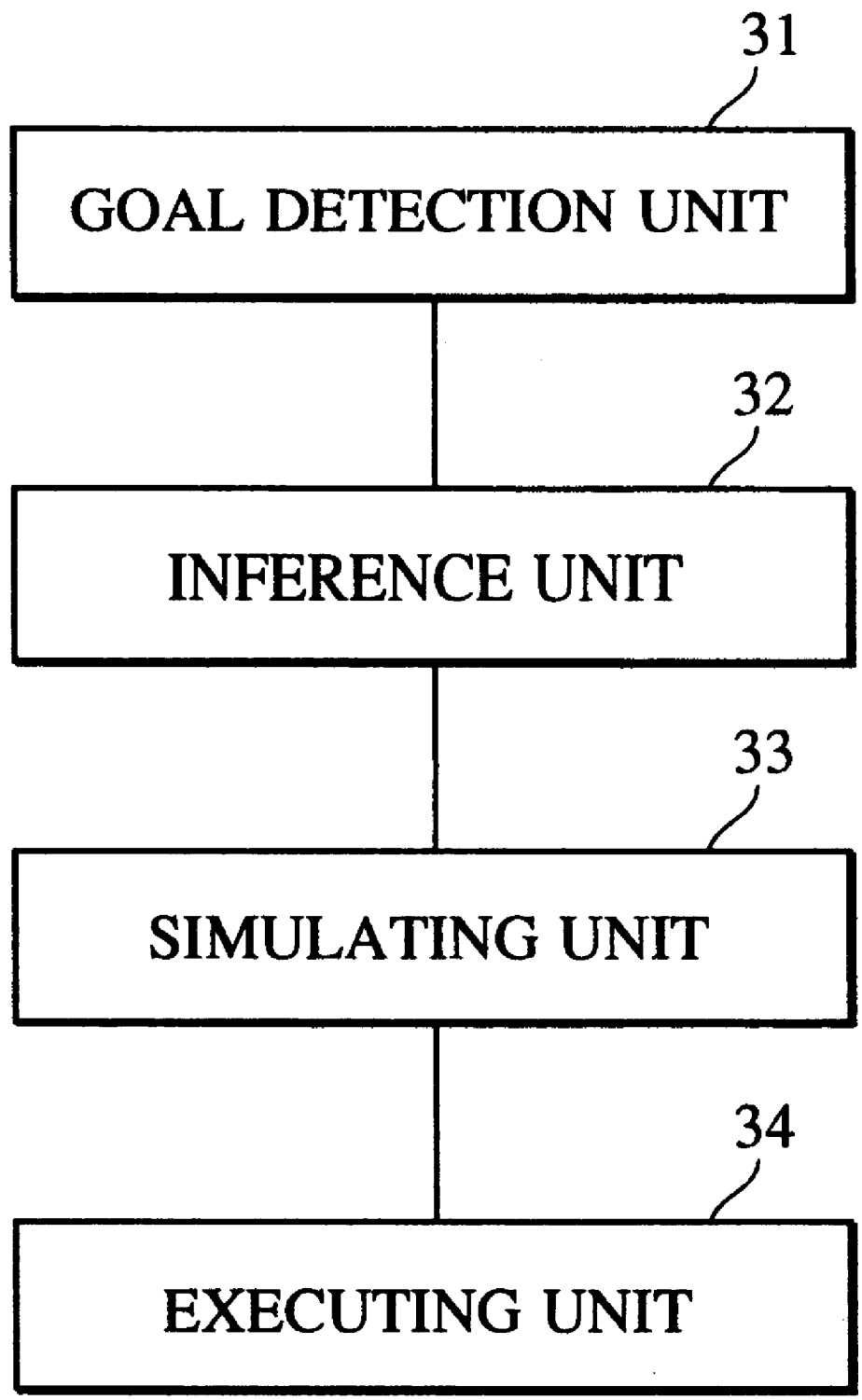
FIG. 3 is a function block diagram of an understander.

FIG. 3 is a block diagram showing an understander 21 according to this embodiment. A goal detecting portion 31 detects the intention of a user, an inferring portion 32 infers operations required to achieve the detected goal. A simulation portion 33 examines the effects (including whether an adverse effect takes place) of executing the operations obtained by the inferring portion 32. An executing portion performs the operation.

FIG. 4 shows an embodiment of a rule base according to this embodiment. If application of the brake by a user is detected, then inference is made that deceleration is needed in accordance with rule (a) shown in FIG. 4. If a fact that the car in the front is braking is detected as the environmental state, then an inference is, in accordance with rule (d), made that the distance with respect to the car in the front is closing in. Moreover, an inference is made that the car needs to increase the distance from the car in the front in accordance with rule (c). Then. an inference is made that the car must reduce the speed thereof, that is, deceleration must be performed in accordance with rule (b). This inference coincides with the inference made in accordance with rule (a). As a result of the foregoing inferences, it can be understood that the reason for the application of the brakes is that the car in the front has braked. Moreover, a goal for deceleration can be obtained. Since deceleration is needed, a hazard lamp is turned on if there is a car close behind and the speed is reduced as slowly as possible in accordance with rule (e). In other cases, the car is decelerated by the value required by application of the brakes. In accordance with rule (f), if the car in the front has started accelerating during the deceleration of the car, then the distance with respect to the front car is increased, then the distance with respect to the front car increases. Thus, deceleration can be abandoned and acceleration can be performed.

A system for writing a letter by selecting required items from a menu will now be described.

FIG. 5 shows an example of a menu screen for inputting information of a sender of a letter, such as name, organization and the like.

FIG. 6 shows an example of a menu screen for inputting information of a receiver, such as name, organization and the like.

The order of first name and family name is different among countries. Accordingly, the system has a model for correcting input error made by a user. In an example case shown in FIG. 6, since "John", which is the first name, has been entered as the family name, it is corrected. Furthermore, the system attempts to add information not given in the input about "John" by making a reference to a data base or the like.

FIG. 7 is a diagram showing an example of a portion of an SDB which is a data base for persons.

Figure 8:
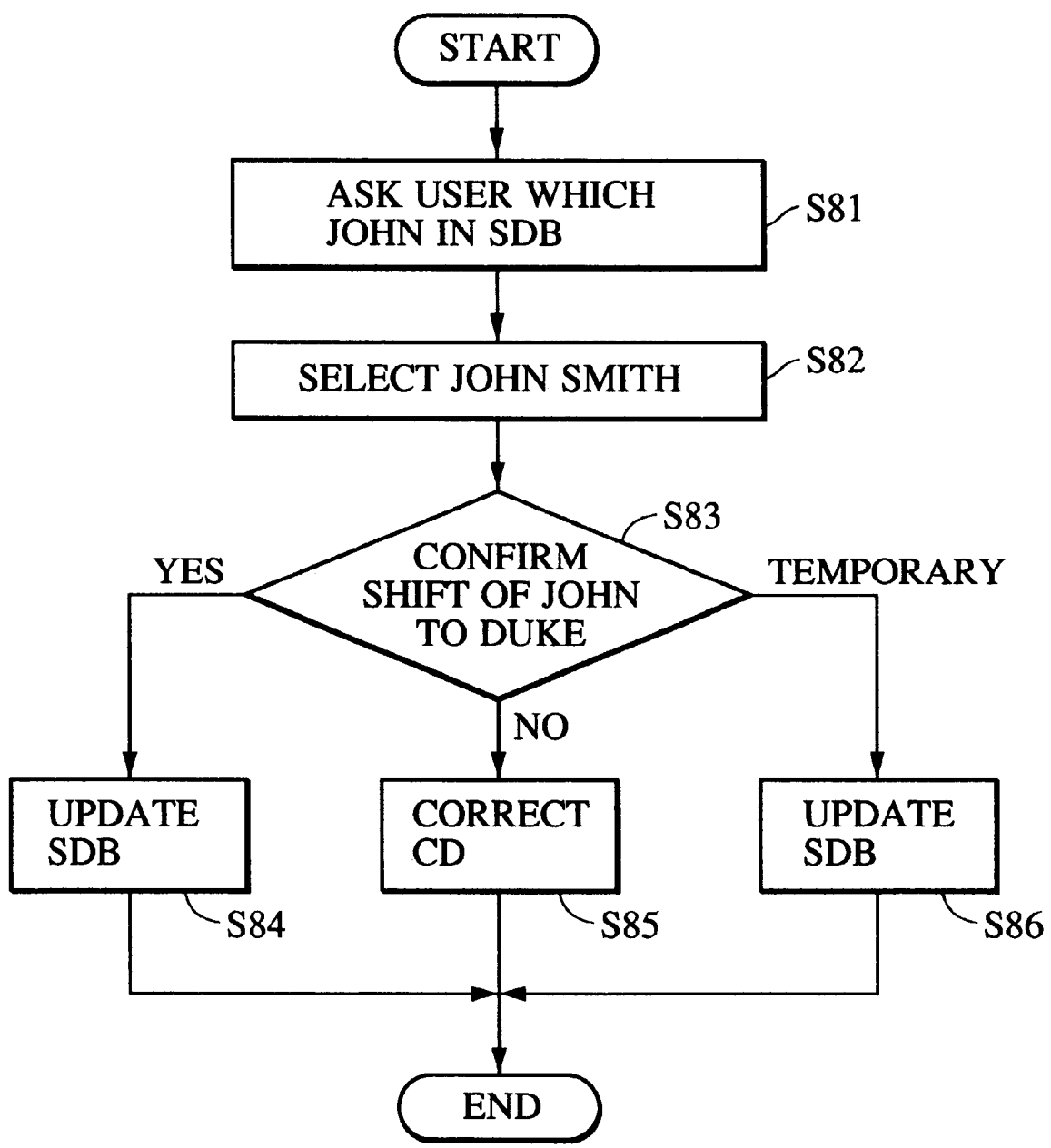
FIG. 8 is a flow chart of a confirmation process.

Since two persons exist whose name is "John" in the SDB shown in FIG. 7, the system according to this embodiment performs a confirmation process in accordance with a flow chart shown in FIG. 8.

In step S81, the system queries the user family name of "John". An assumption is made here that the user has selected "John Smith" in step S82. Although "John Smith" belongs to Rochester University in the SDB, "Duke" has been, as the organization, input together with "John". Therefore, the system queries the user in step S83 whether "John" has shifted to the Duke University.

If the user replies YES, then the operation proceeds to step S84 so that the organization to which "John Smith" belongs is changed to the Duke University. If the reply from the user is that he has made a mistake, the concept is corrected in step S85. If the reply from the user is that the shift for a temporary shift in a limited period, this fact is input into the SDB in step S86.

If only one person, whose name is John and who belongs to the Duke university, exists in the SDB, the process shown in FIG. 8 may be omitted but a determination of the person or information of the person may be output to cause the user to confirm the person.

If any previous communication or relationship cannot be detected between the sender and the receiver, the system assumes that the letter to be written is a first letter from the user and displays a menu screen shown in FIG. 9.

FIG. 9 shows a menu screen through which the purpose of the letter is input.

An assumption is made here that a user has selected "1", that is, the user intends to visit John. Then, the system displays a menu shown in FIG. 10 to obtain a sub-goal for the visit. An assumption in made that "1" is selected.

FIG. 11 shows a menu through which information about the visit will be input. The shaded portions are portions inferred by the system. As for the date, if the current date is the tenth day of April, 1993, then an inference is made that the visit will be made in 1993. If the user has input the seventh day, the system may infer that the visit will be made on the seventh day of May which is the nearest future seventh day. If the system is so structured, the user is required to simply input "7".

Moreover, from the input information of receiver being John and letter being about visit, the system infers that there is a good possibility of the visit being to John and at his organization and, therefore "Duke University" is displayed to which John belongs. As a matter of course, the information input by the system can be rewritten by a user.

In the case where the user has input "y" in reply to the query from the system "Any other Requests" as shown in FIG. 11, a menu shown in FIG. 12 is displayed. An assumption is made here that the user has requested John to reserve accommodation for the user to stay in a hotel and therefore the user has selected "1".

In accordance with the foregoing input, a letter as shown in FIG. 13 is output.

When the system infers the reason for the user to visit the person, it assumes that the user believes that information can be obtained from the receiver which would satisfy the users general goal of finding information and searches for a reason for that the belief of user. Accordingly, the system searches for the relationship between knowledge of the work of the user and knowledge of that of the receiver.

Moreover, the system has a function which makes a reference to the contents of the previous communication records (existing in a history of operations for the user) to make an inference and make a plan.

In the case where an appointment is being fixed in a first letter to the receiver from the user, the system examines the user's schedule (from the contents of the previous letters or otherwise), finds any overlap, correlation or anything else which can contribute to a reason, and infers the reason for the visit to be in the specified period (the period which is given as the time of the meeting). In the case where a letter is written as a response to the receiver's letter, the system establishes the relationship with the receiver by using the history, fetches the latest letter from the data base and the user'schedule and predicts the response from the user (for example, whether the date is acceptable) in accordance with the contents of the latest letter and/or the schedule.

An embodiment of d case will now be described where the system prompts the residual commands to the user in case the commands have been input incompletely.

In the case where only one command exists corresponding to the input, then the system completes the user's input by that command, for example, in a case where "Sav" have been input by the user, only one command "Save" correspond to "Sav" so that system assumes it to be "Save".

If many corresponding commands exist, for example, if "co" have been input by the user, commands "compile", "Copy" and "continue" correspond to "co", then if the history of the commands input by the user is stored then it can be accessed to find that the last command input by the user is "Save". Thus, an inference can be made that "co" is most likely to be "compile" as that is the logical follow up command after saving.

Figure 28:
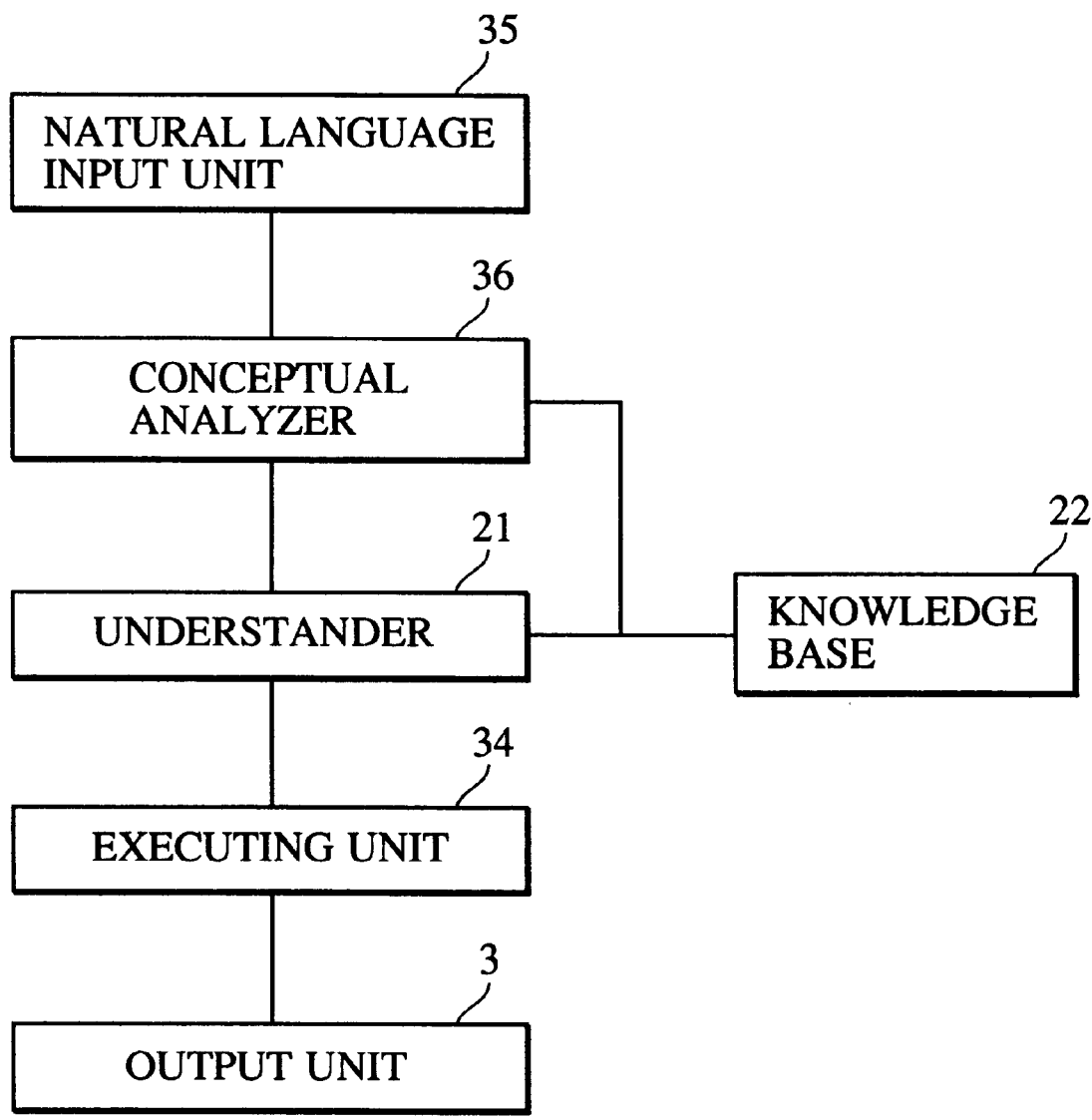
FIG. 28 is a function block diagram of an information processing system according to the embodiment of the present invention.

An embodiment will now be described in which information input in a natural language is processed. FIG. 28 shows a basic function blocks of an apparatus for processing information input written in a natural language.

Referring to FIG. 28, an input unit 35 is used to input a command from a user in natural language, the operational state of the apparatus, the environmental information and the like. A conceptual analyzer (CA) 36 analyzes the concept of natural language information input by the input unit 1 by making a reference to a knowledge base 22 having knowledge of languages and common sense. An understander 21 has a pre-understander and a main understander to understand the current situation to produce required information to be output. The knowledge base 22 has knowledge, such as causes and results. Information produced by the understander 21 is transmitted to an output unit 3 to be output to the user or a predetermined apparatus.

According to the foregoing embodiment, an optimum response can be realized in accordance with a minimum input given. Even if input information has an error, the error can be corrected and then the response having no error can be made. Moreover, the risk of executing a process which might result in a problem due to, for example, an erroneous is command, can be prevented.

An embodiment will now be described in which a letter is written in accordance with an input in a natural language. The detailed structure of this embodiment has been described by the applicant of the present invention in U.S. Pat. No. 492,930 (Europe Patent No. 95,304,346).

In the case where "Reply to John's letter accepting to meet on 10th May at 3 pm to discuss on PDA system," has been input as shown in FIG. 14, the conceptual analyzer (CA) 36 for analyzing the natural language input to output a corresponding concept, transmits, to the understander 21, concept C1 shown in FIG. 14 as a result of the analysis of the input.

An assumption is made here that the pre-understander of the understander 21 is not called for, in this example. The processing by the main understander will now be described.

Initially, actors included in the information are found. As shown in portion (a) of FIG. 15, the sender is a Rohra and the receiver is John Smith. The type of the letter is a response. Moreover, the data base has no contents which would refer to the context. However, the context can be obtained from the input, since the sender wishes to create a response. The letter from the receiver can be inferred from C3 obtained from the analyzed input.

Figure 16:
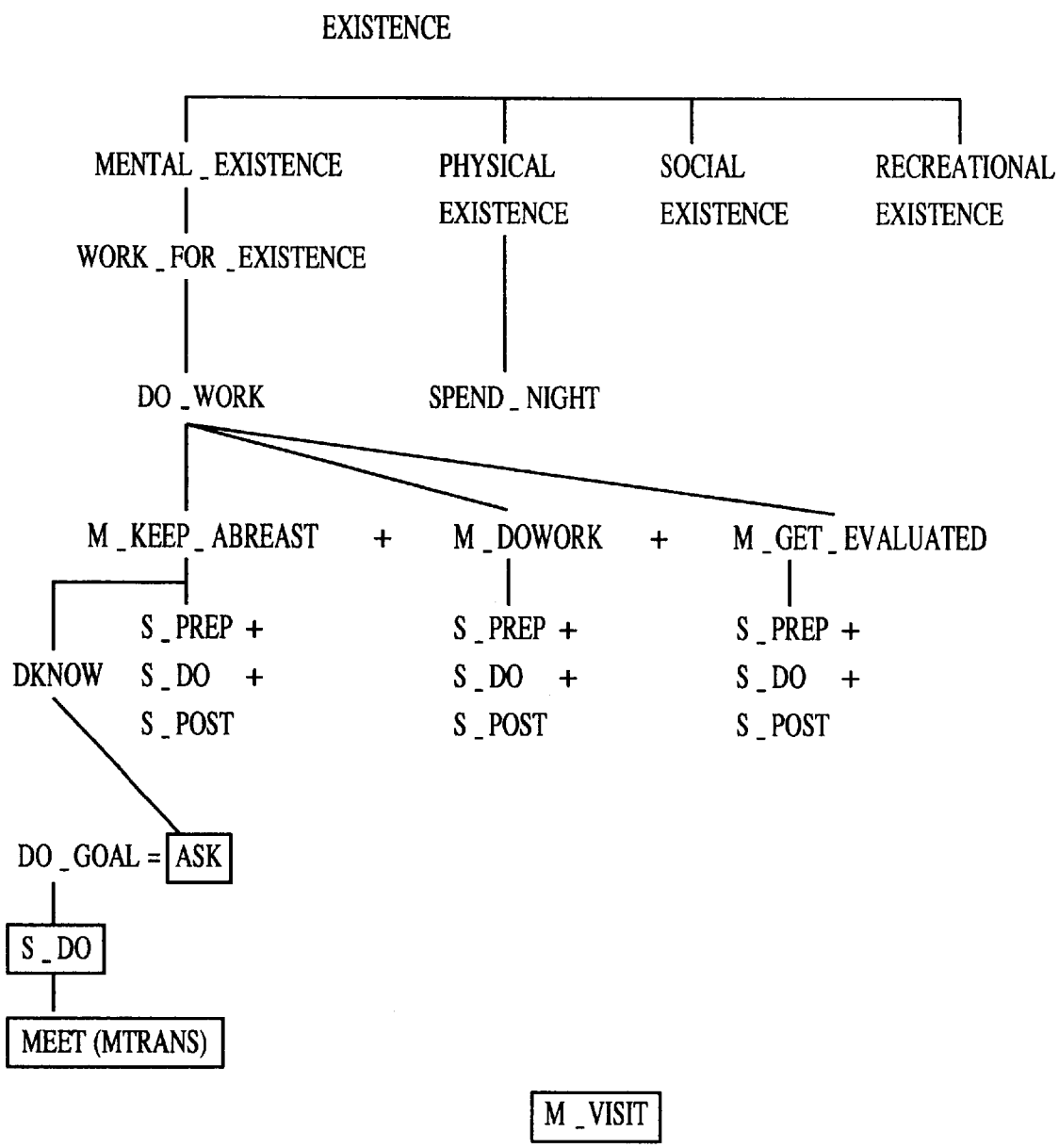
FIG. 16 shows an example of a result of a chained inference.
Figure 17:
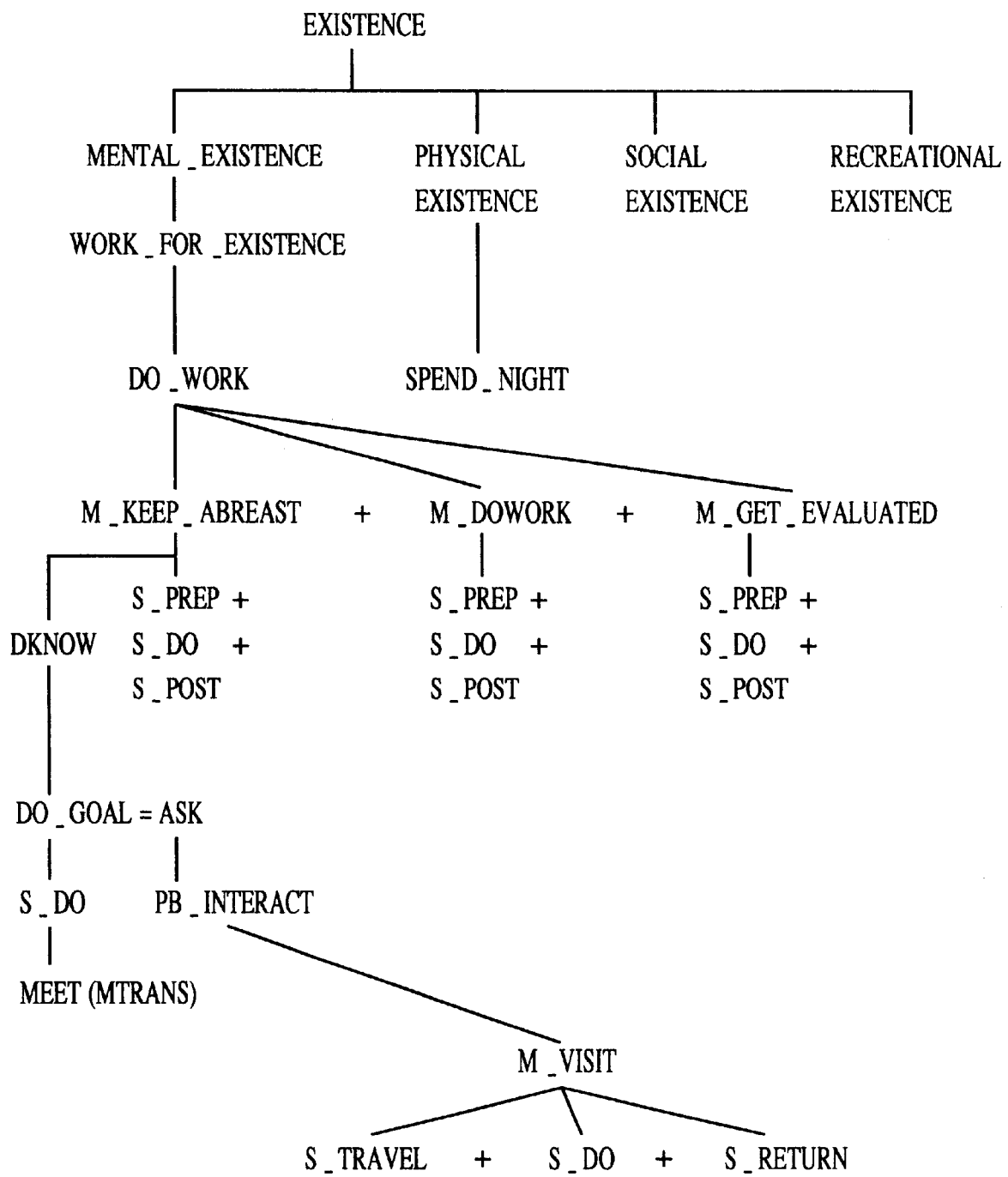
FIG. 17 shows an example of a task network.
Figure 18:
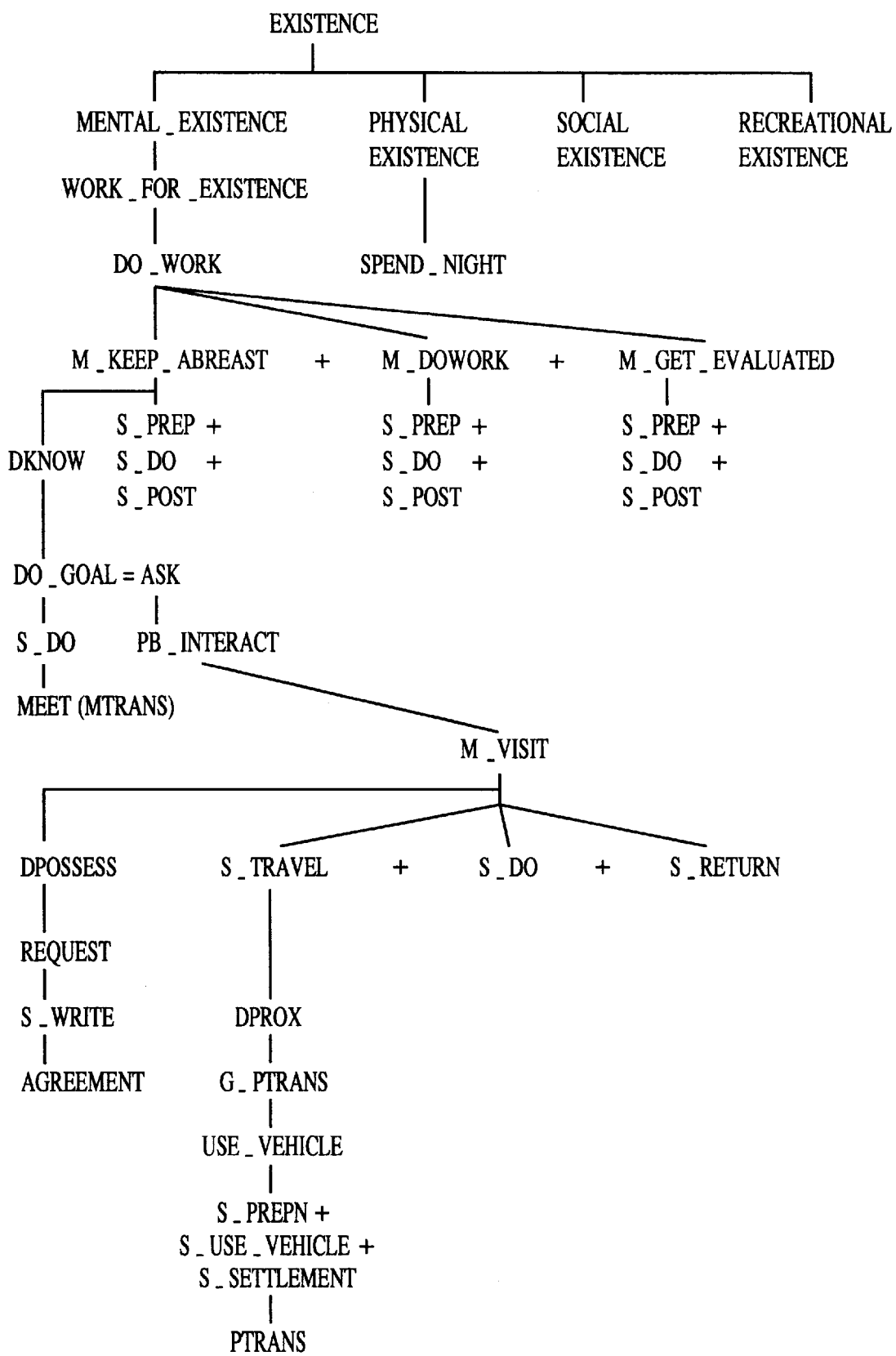
FIG. 18 shows an example of a completed task network.

Accordingly, the main understander processes C3, thus resulting in a goal being inferred as shown in portion (d) of FIG. 15 so that a chained inference as shown in FIG. 16 is made. Then, a plan for understanding is made. That is, a task network having a structure as shown in FIG. 17 is constructed which connects the good ASK to M-visit, thus explaining the input. Further, the post-understander completes the incomplete portion in the plan shown in FIG. 17 so that a task network shown in FIG. 18 is obtained. In accordance with the foregoing plan, a letter from the receivers is re-constructed for confirmation.

Then, a response letter from the sender is written in accordance with the input (C2 obtained from the input). With respect to CD of the received letter, S_MAINGOAL, which is a discussion about the PAD system, is inferred to be an acceptable request, S_MAINPLAN, which is meeting, is accepted, and a more specific value for the time is specified by the user as 10th May 3 pm with respect to S_PLAN (e.g., after 8th May), as shown in portion (a) of FIG. 15. Thus, a letter shown in FIG. 19 is written.

Another embodiment of the letter will now be described. In this embodiment, the previous context is assumed to be available in the data base. Therefore, only those portions which are different from the foregoing embodiment during processing will now be mainly described.

In the case where "Reply to John's letter confirming the meeting time, 19th May at 3 pm. Also, request him to arrange for pickup" are input as shown in FIG. 20 concepts C1 and C4 are output from the CA 31.

In the main understander, the reference and previous context can be obtained from the data base so that visiting after 10th May and the need of response to John's letter are understood. As shown in portion (d) of FIG. 21, the previous letter is retrieved from the data base. As shown in portion (e) of FIG. 21, S_MAINGOAL, which is a discussion about the PAD system, is an acceptable request, and S_MAINPLAN, which is meeting, is accepted. The foregoing facts can be inferred from the input "confirming the meeting time, 19th May at 3 pm." A more specific value for time is specified by the user as 19th May 3 pm with respect to S_PLAN. As the letter from the sender, other requests are added (a request for picking up can be inferred from "request him to arrange for pickup") in addition to the confirmation response. Then, processing as in the foregoing embodiment a letter shown in FIG. 22 is written.

Another embodiment of the letter will now be described. In this embodiment, the system cannot infer the letter from the receiver from the given input but instead the system requires the user to input that information.

Then, portions different from the foregoing embodiment will now be described.

In the case where "Reply to John's letter" have been. input as shown in FIG. 23, concept C1 is output from the CA 31.

In the main understander, the reference and previous contexts are assumed to be obtainable from the data base so that visiting after 10th May and the need to respond to John's letter are understood. As shown in portion (d) of FIG. 23, the previous letter is retrieved from the data base. Since nothing has been specified in the input as shown in portion (e) of FIG. 23, the system cannot infer the receiver's letter, hence it queries the user to input the contents of the letter, e.g., by an OCR. Thus, the contents of the letter as shown in portion (e) of FIG. 23 are input. Then, as shown in FIG. 24, processing similar to the one for foregoing embodiment is done, so that a letter shown in FIG. 25 is written.

An embodiment, in which natural language is used to operate an apparatus, will now be described.

Figure 26:
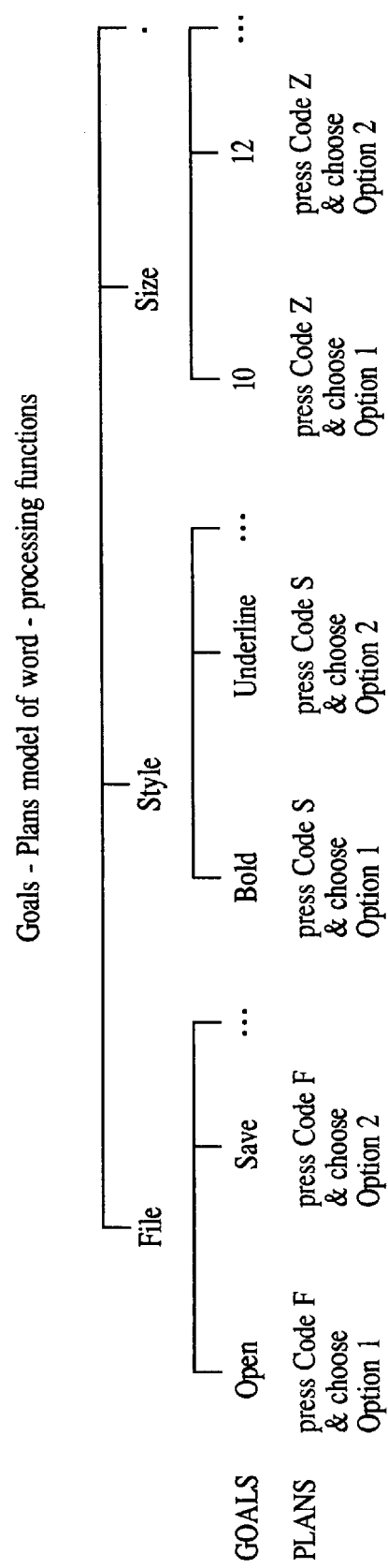
FIG. 26 shows an example of a related knowledge base.

FIG. 26 shows an example of knowledge in a knowledge base relating to commands in this embodiment, which stores processes and the procedure of the operations for inputting commands for use in the processes in the form of goals and plans.

FIG. 27 shows specific examples of the input and plans to be executed. If "Change the size and font of the letter to bold and 12 point," have been input as shown in FIG. 27, a procedure is retrieved in accordance with the knowledge shown in FIG. 26 to change the font to bold and the size to 12 point. It can be inferred from the form of the input sentence, that the user requires the system to perform an operation in accordance with the foregoing command, therefore the system executes the procedure obtained as a result of the retrieval as shown in FIG. 27.

The operation of the system will now be described, in which, the same processing as that in the foregoing embodiment is carried out, but help information is required to operate the apparatus in place of requiring the apparatus to execute the process. As in the foregoing embodiment, the system uses the knowledge shown in FIG. 26.

FIG. 29 shows a specific example of input and outputs for such a case When "How can I change the size and font of the letter to bold and 12 point," have been input as shown in FIG. 29, the procedure for changing the font to bold and size to 12 point is retrieved from the knowledge shown in FIG. 26. From the form of the input sentence, it is understood that the user intends to know the procedure to operate the apparatus. Thus, the system outputs, to the user, the operational procedure obtained as a result of the retrieval as shown in FIG. 29.

Another embodiment in which the operation of the apparatus is performed through a natural language will now be described.

Figure 31:
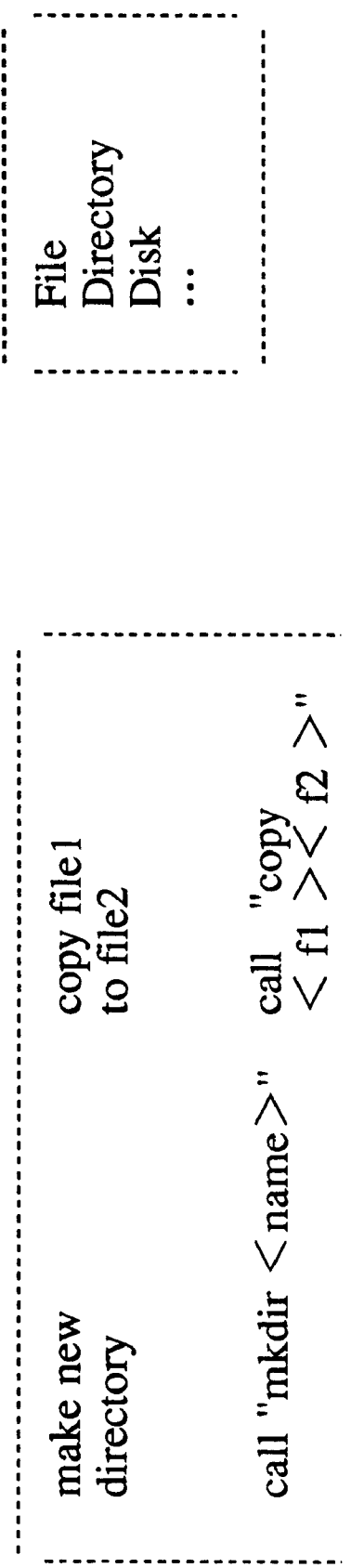
FIG. 31 shows an example of knowledge base of commands.

FIG. 30 shows input and output processes according to this embodiment. FIG. 31 shows an example of knowledge used in this embodiment. If "Save this file in a separate directory under MEMO" have been input as shown in FIG. 30, the CA 36 analyzes that "this file" implies the current tile and "separate directory" is a new directory. Thus, the understander makes name (MEMO1 formed by adding an extender to MEMO) of the new file in accordance with a rule, and copies the current file to the foregoing directory. Then, the understander outputs the result of execution. If "make it confidential" has been input, an interpretation by the CA 36 is in effect to forbid access from another person and therefore protect is executed.

As another embodiment in which the operation of the apparatus is performed through a natural language, an embodiment in which OA machine is operated will now be described.

Portion (a) of FIG. 32 shows a case where a copying machine is operated, while portion (b) shows a case where a facsimile machine is operated.

In the example shown in portion (a) of FIG. 32, when "make 5 copies of this reduced to A4" have been input, the CA 36 interprets that this is a current document and causes a scanner to scan the document so as to detect the current situation that the size of the document is, for example, A3. In accordance with the detected size and the specified size, the reduction ratio is determined. Moreover, a tray for the specified paper is selected. At this time, if the size of paper to be output is A4R, this fact may be warned to the user so as to be confirmed. Then, copying is performed, and a message that copying has been performed is output.

In the example shown in portion (b) of FIG. 32, if "send this to Mr. Smith and it is not urgent" have been input, CA interprets that "this" is a current document similarly to the foregoing embodiments. Since it can be understood that current facsimile operation is not urgent from the input information, the original document to be transmitted is read and stored to be transmitted at night. If the line is busy, retrial is performed after a certain time has elapsed.

If "Have you sent the fax to Mr. Smith? Has he replied?" have been input additionally by the user, the transmission history is examined to check whether the transmission has been performed. A result and time of the transmission are reported to the user.

Whether a reply has been received from Mr. Smith may be confirmed by an OCR or the like to report a result of the confirmation to the user.

An example of maintenance of the contents of the data base will now be described. FIG. 33 shows an example of an input and processes to be performed in accordance with the situation, according to the present invention.

If "check whether Smith's address is still Rochester, if yes, change it to Duke" have been input as shown in FIG. 33, the system finds Smith in the data base. It not unique and the one with address at Rochester is found. Then, the system confirms from the user that he means that. If one corresponding Smith has been found, a global data base is searched prior to performing replacement to obtain complete name and address of Duke. Thus, "Duke" can be inferred to be the Duke University and, in this case, confirmation with user is performed whether new address may be added to John.

If no "Smith at Rochester" is found, whether or not one with address at Duke exists is checked. It that is found, it is shown to the user to be confirmed. If the user confirms that he means the same Smith as the one system has found, then nothing is done.

If no Smith is found at Rochester and not at Duke, a list of all entries of Smith is shown to the user for selection of the appropriate one by the user. Then, the address of the selected person is changed.

If nothing is found, the system queries the user whether new data is to be created.

An embodiment in which the contents of the data base are maintained during the processing of an input which itself is not an instruction for data base maintenance will now be described.

FIG. 34 shows an input and a process to be performed in accordance with the situation according to this embodiment.

If a command to write a letter as "write to John Smith at the Institute of Optics, Univ. of Rochester, Rochester, N.Y." has been input, the pre-understander of the system infers that "Institute of Optics" is the organization belonging to Univ. of Rochester and that Rochester is a city and "NY" is a state and the last-two are parts of address.

In accordance with the given and inferred information, the system makes a new entry in the data base. At this time, the system queries whether the given address is a complete address. The user replies that it is sufficient although it is not complete, and instructs the system to add a zip codes. Thus, the system adds the zip code, stores the. complete entry in the data base, and continues with letter writing.

An embodiment in which a command from a user is supplemented by the system will now be described.

FIG. 35 shows an example of an input and an output according to this embodiment. The user initially inputs "write to person in charge at ABC for purchase of their new PC's".

FIG. 36 shows an example of the structure of a data base for use in this embodiment. In this embodiment, five entries exist with respect to ABC corporation as shown in FIG. 36. However, since the system knows that the user is in Tokyo from the information about the user, entries except those for Japan are ignored.

Figure 37:
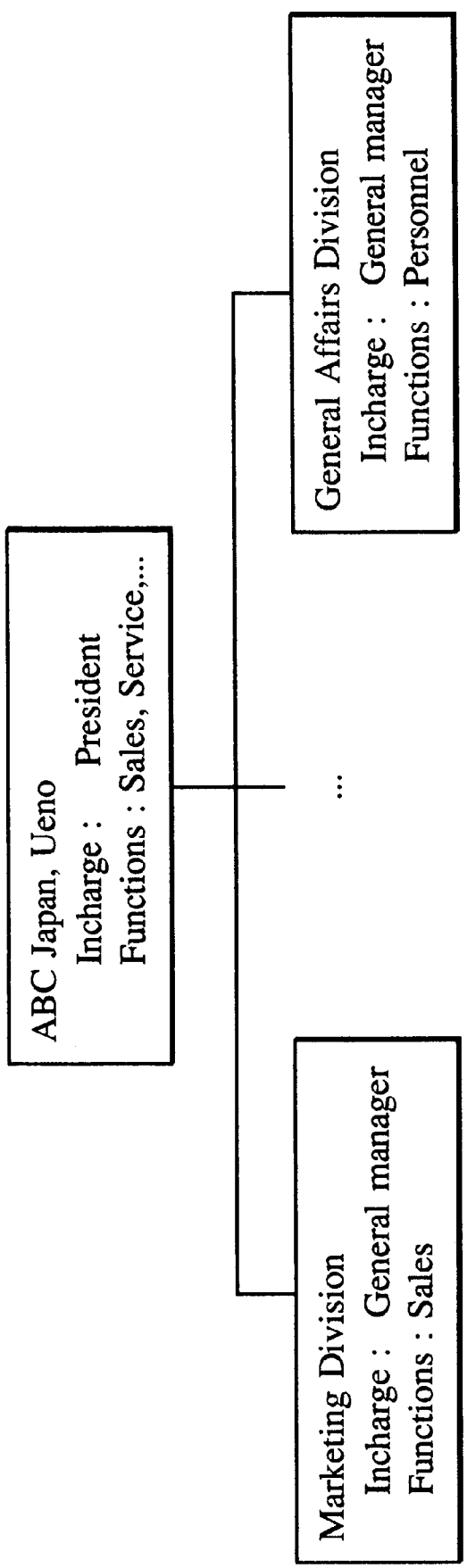
FIG. 37 shows an example of the structure of a domain knowledge base.

FIG. 37 shows an example of a knowledge base of then ABC corp for use in this embodiment. The system infers that the user intends to write a letter to the organization in Ueno because the user wishes to write about purchase, so it must be to the Sales division and among sales organizations it is the one nearest to Tokyo. Accordingly, the system outputs "I assume you means ABC Japan, Ueno since they are handling sales-shall we write to them?" as shown in FIG. 35 to be confirmed by the user. If this is confirmed, the knowledge base storing the organizational knowledge, shown in FIG. 37 is used to infer an appropriate receiver of the letter being General Manager, Marketing Division, ABC Japan and the system outputs a letter to General Manager, marketing Division, ABC Japan, Ueno, Japan".

An example will now be described in which help to a GUI (Graphical User Interface) is in natural language.

FIG. 38 shows an example of input and output for help to change the input mode in the case where the user is a beginner, and "How can I change the input mode to enter in Katakana?" has been input in a Roman input mode.

Figure 39:
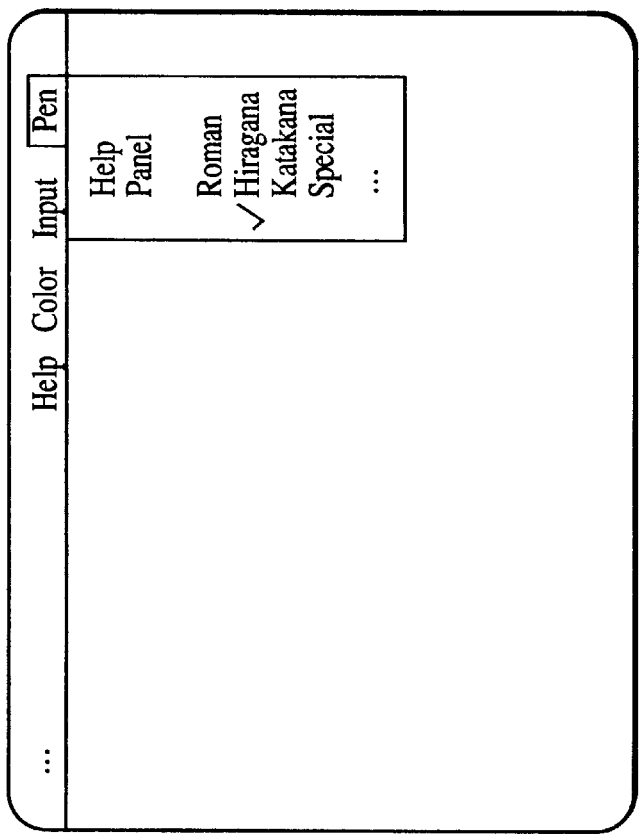
FIG. 39 shows an example of input and output when an input mode is changed.

FIG. 39 shows an example of input and output for help to change input mode in a case where the user is a beginner, and "How can I change the input mode to enter in Katakana.?" (same as in previous example) has been input in a Japanese (Hiragana) input mode.

FIGS. 40 and 41 show examples of input and output for help to change the input mode in cases where the user is a medium level user, and (the same input as in previous example) "How can I change the input mode to enter in Katakana?" has been input in the Romaji input mode and a Japanese input mode in a state respectively. In the aforesaid examples of help to GUI, either a help system, itself separate from the GUI or in case of help along with GUI, query input means other than the GUI itself, e.g., voice, are envisioned.

Figure 42:
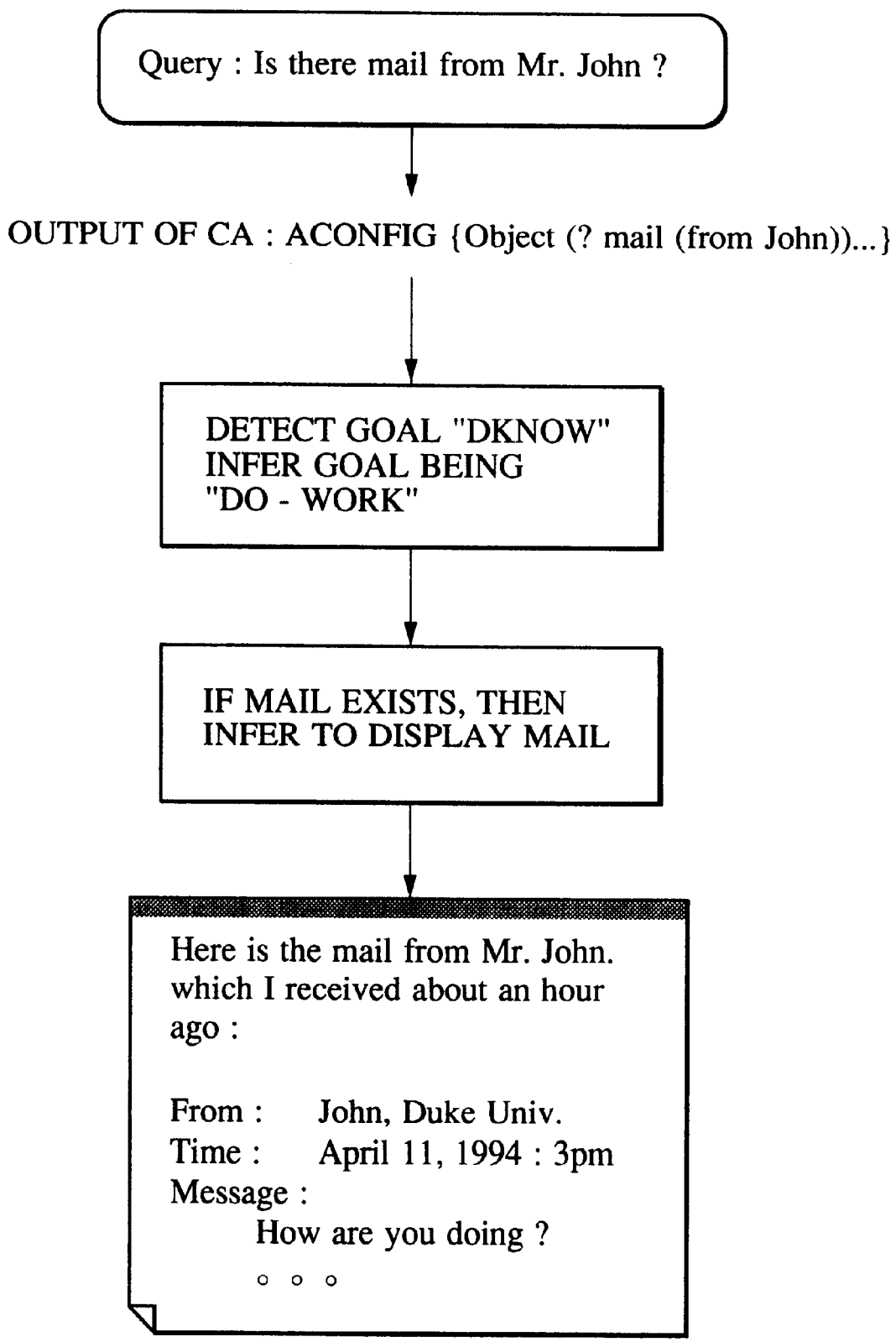
FIG. 42 shows an example in which a query from a user is processed.
Figure 43:
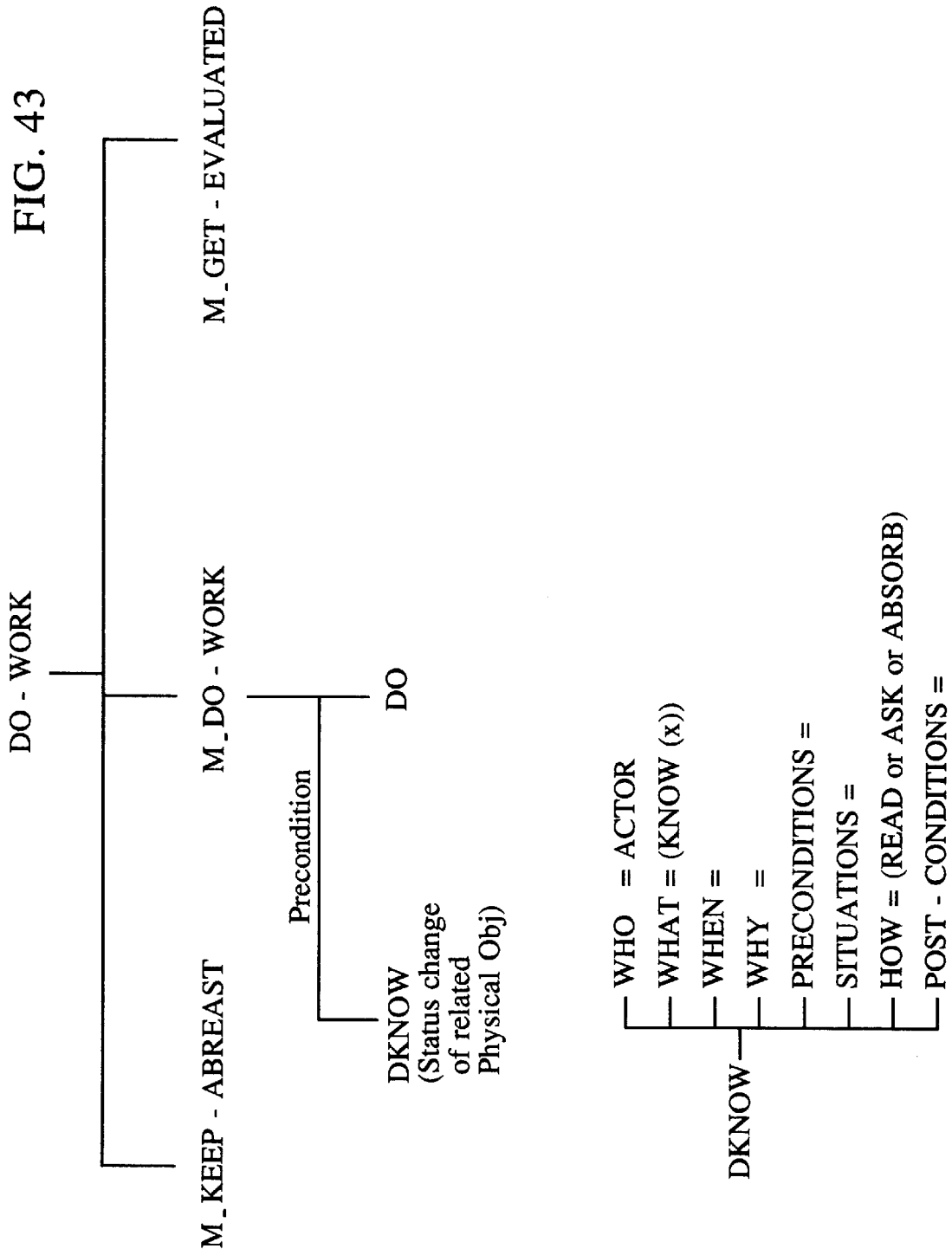
FIG. 43 shows an example of a goal and plan structure.

FIG. 42 shows an example of processing in a case where a query has been input by a user that "Is there mail from Mr. John?". The system infers that the goal of the user is DKNOW, that is, to know a fact. On the basis of the goals; and plans knowledge shown in FIG. 43, the system also infers that this goal has been generated by DO-WORK goal.

Accordingly, the system infers that it is not really that the user wants to know whether the mail exists, but that if it does, he wants to read the mail. Therefore, the system infers that it must display the mail. If a mail exists, the contents of the mail are displayed as shown in FIG. 42 along with the information about the time of receipt.

Figure 44:
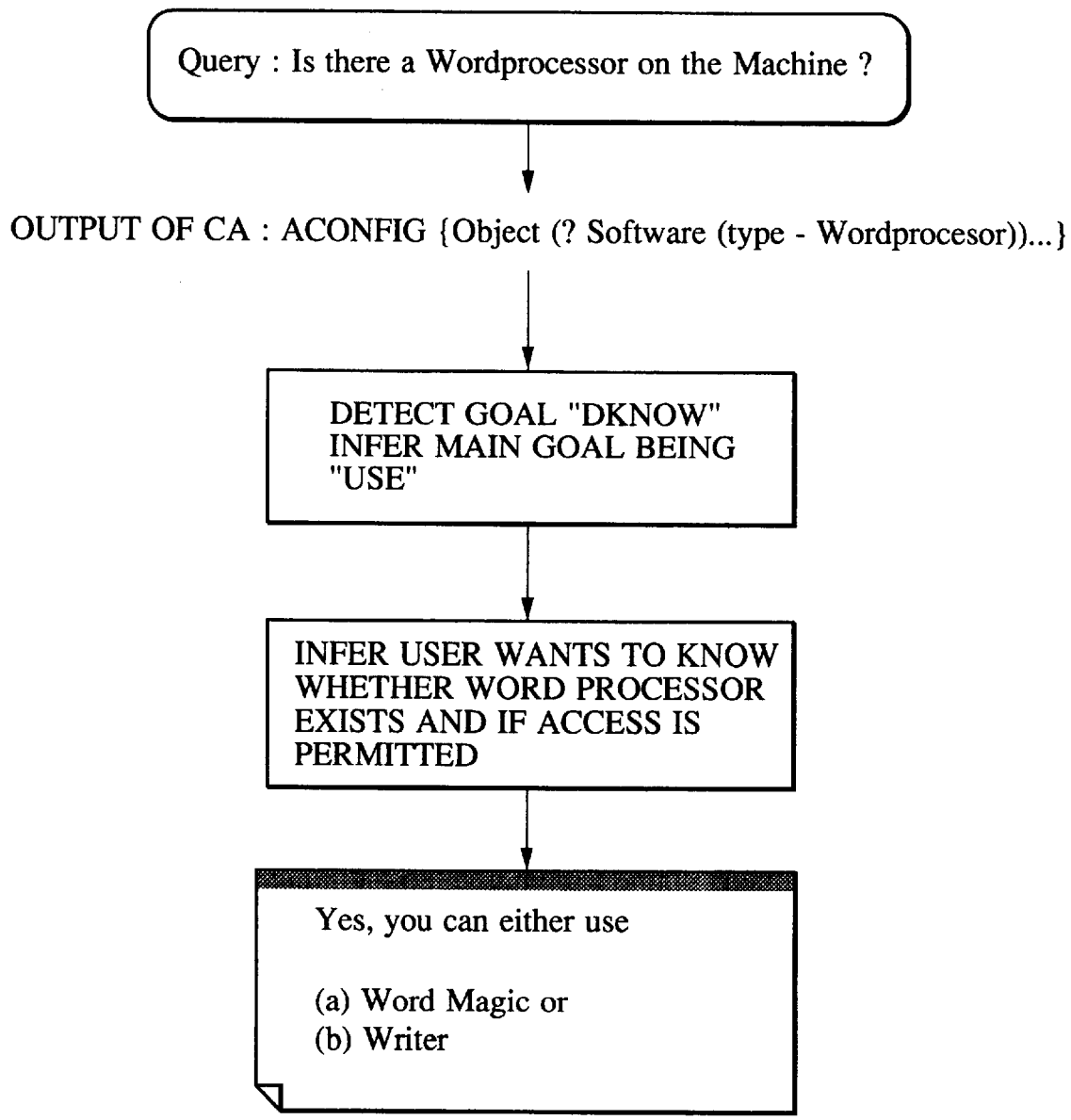
FIG. 44 shows an example in which a query from a user is processed.
Figure 45:
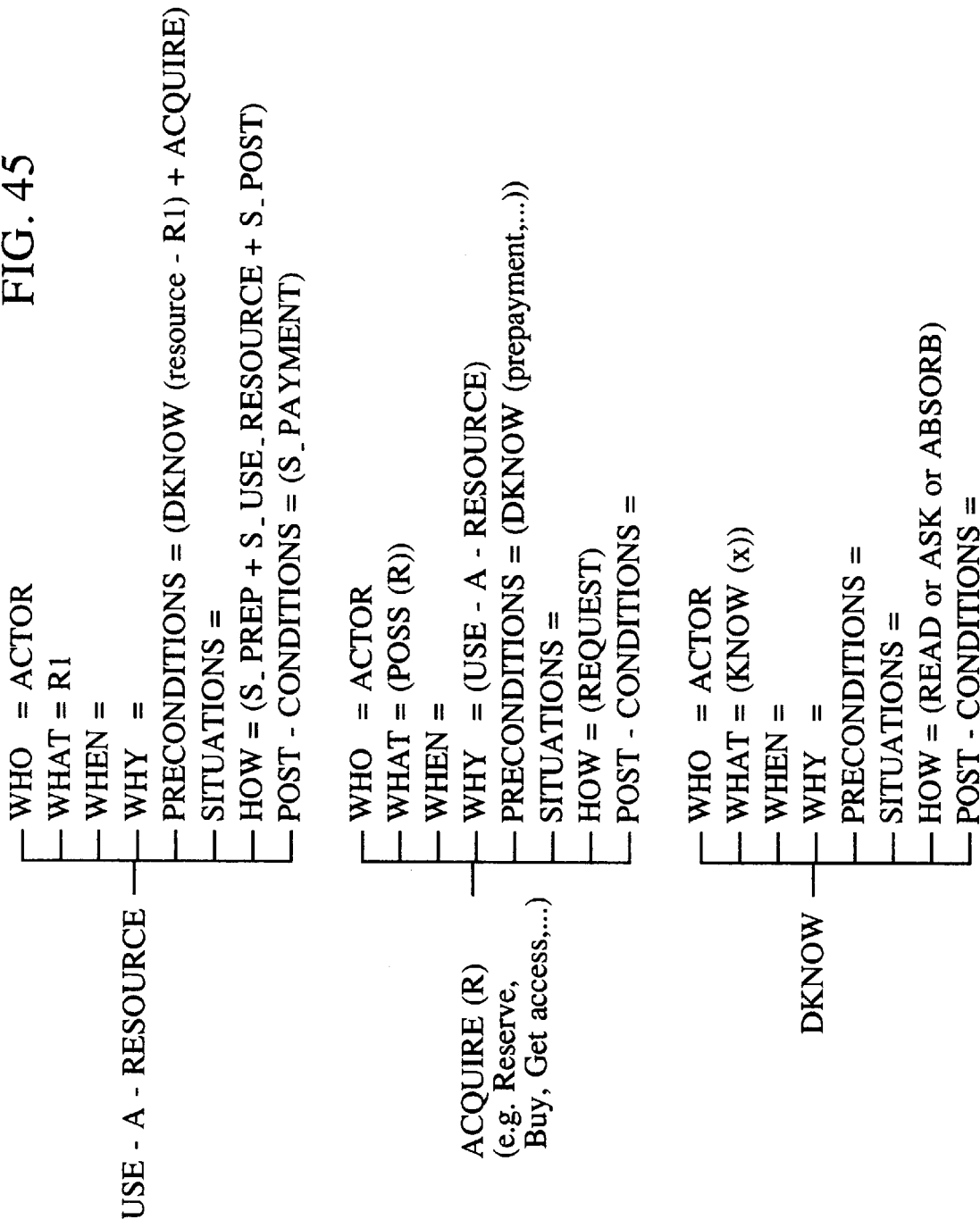
FIG. 45 shows an example of a goal and plan structure.

FIG. 44 shows an example of a process to be performed in a case where a query has been input by the user that "Is there a Wordprocessor on the Machine?". In the system, the CA 36 analyzes the natural language input and the understander detects that the goal of the user is DKNOW, that is, to know a fact. On the basis of goals and plans knowledge shown in FIG. 45, the system infers that the main goal behind DKNOW is USE. Therefore, it is also inferred that finding existing wordprocessors is not enough, rather, the ones which the user is allowed access to, must be found, and accordingly the output shown in FIG. 44 is generated.

Figure 46:
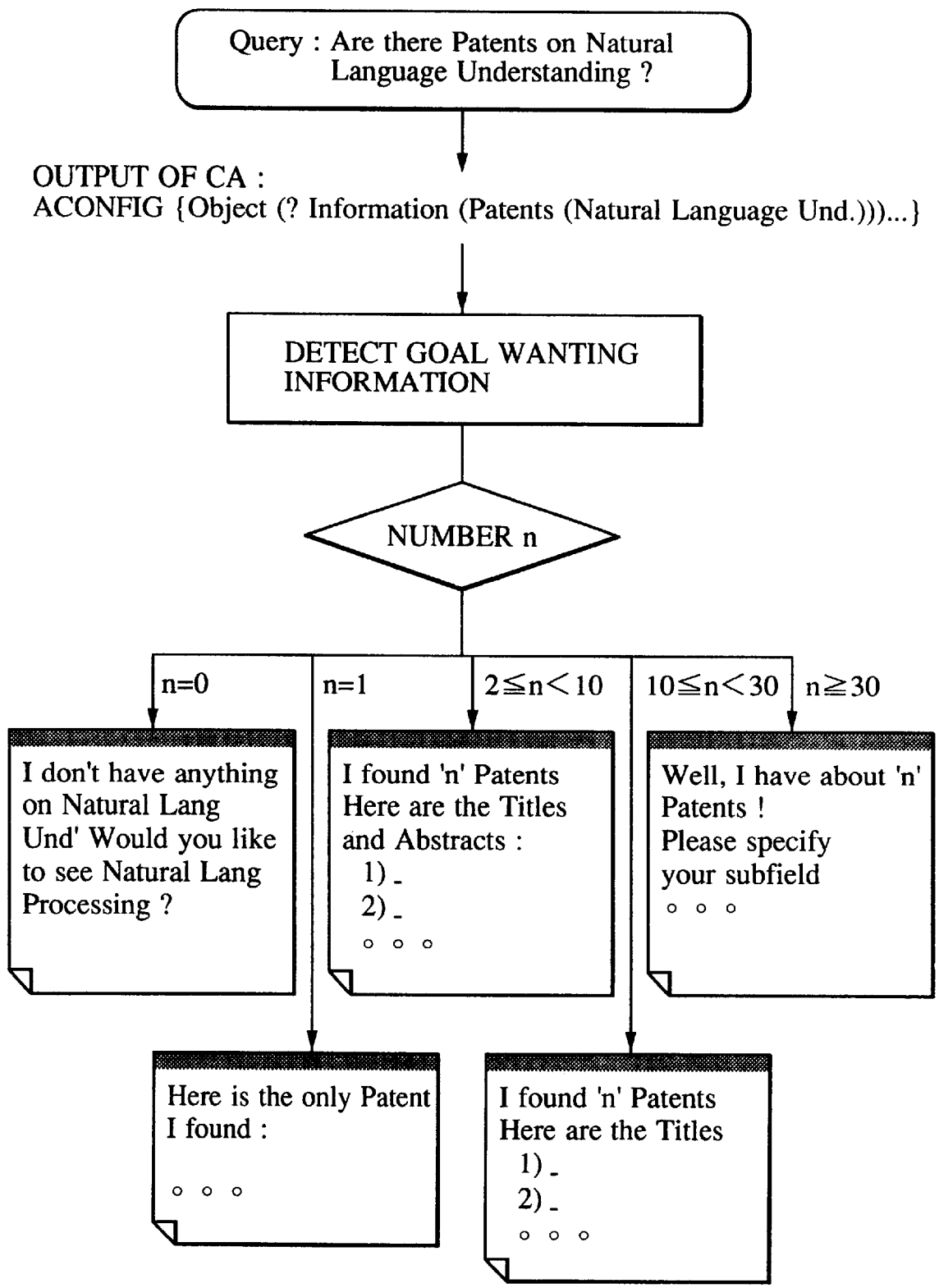
FIG. 46 shows an example in which a query from a user is processed.

FIG. 46 shows an example of a process to be performed when a query has been input by a user that "Are there Patents on Natural Language Understanding?". As in the previous two embodiments, it is inferred that the goal of the user is DKNOW, that is, to know a fact. Similar to the embodiment shown in FIG. 42, a discrimination is made that the user does not only want to know whether patents exist but that the user wants to look at the patents. Assuming there are n patents, full contents of the patents are output in a case where there are one or two patents, i.e., n=1 or 2. If there are many patents, abstracts, titles and the like are displayed depending on the value of n (see FIG. 46). If there are too many patents to display information about the patents, more information to narrow the classification is requested from the user.

As described above, according to this embodiment, an optimum response can be realized for a minimum input given in a natural language.

Even if there is an error in the input information, the response can be made after correcting for the error.

A system for processing information depending on the user will now be described.

Figure 47:
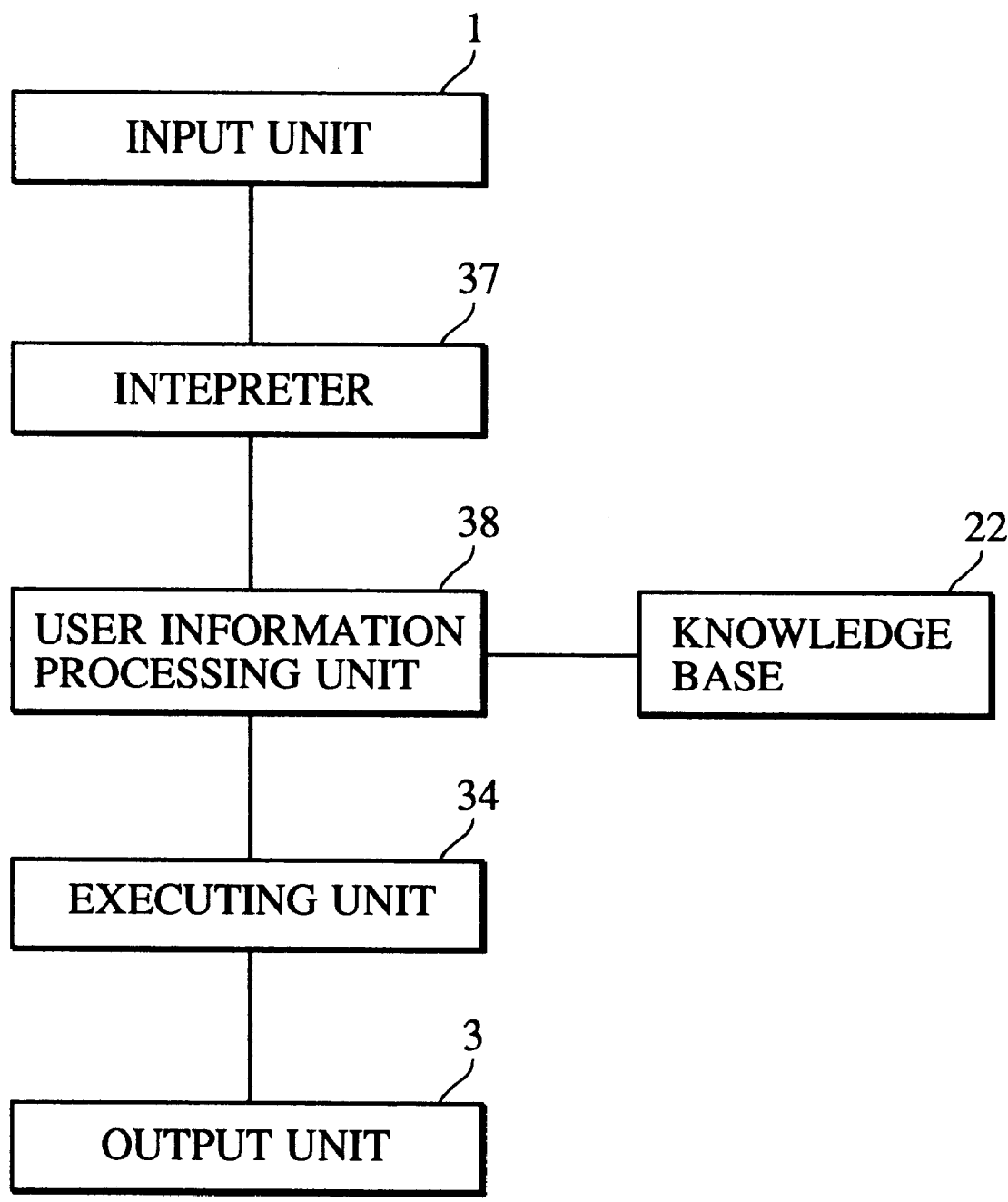
FIG. 47 is a function block diagram of an information processing system.

FIG. 47 is a function block diagram showing the basic components of an information processing system according to an embodiment of the present invention.

Referring to FIG. 47, in the input unit 1, input of commands by using a keyboard, selection of a button, input by a sensor and the like are given. An interpreting unit 37 interprets command input, or specified contents corresponding to the selected buttons and states obtained by the sensor.

A user information processing unit 38 uses the results of the interpretation provided by the interpreting unit 37, knowledge of a user model and the history of operations performed by the user, which have been stored in the knowledge base 22, to infer the user's expertise level with respect to the system and the current operational environment. Then, the system adds information about the result of the inference to the result of interpretation obtained by the interpreting unit 37 or processes the result of interpretation given by the interpreting unit 37 in accordance with information about the result of the inference to convey thus obtained knowledge to an executing portion 34. The executing portion 34 modifies the operational logic in accordance with the foregoing knowledge to execute specified commands and the like. The result of execution is, from the output unit 3, output via a display to the user or transmitted to another system, for example, a document preparation apparatus or output as information for controlling operating mechanisms.

Figure 48:
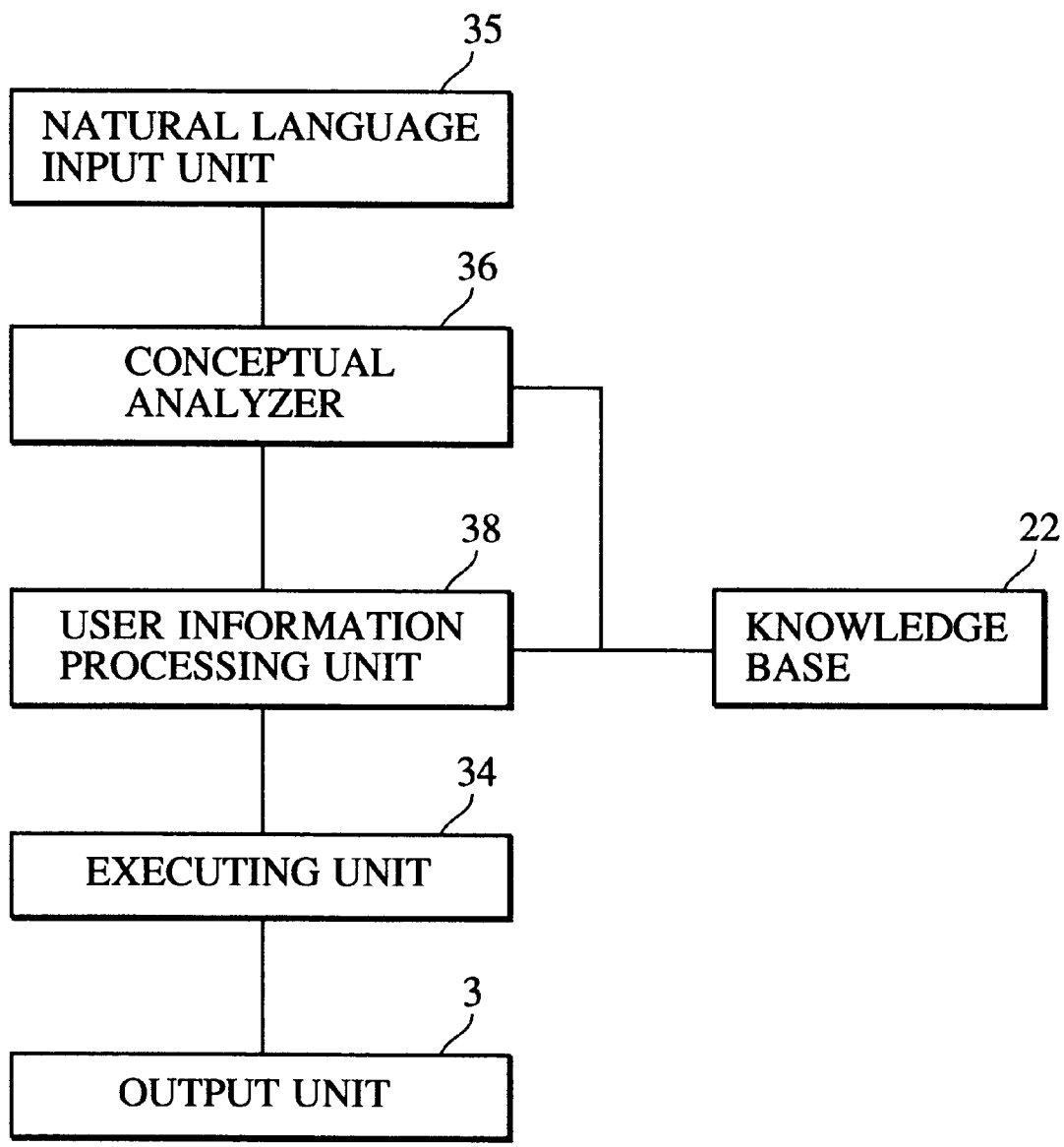
FIG. 48 is a function block diagram of a natural language processing system.
Figure 49A:
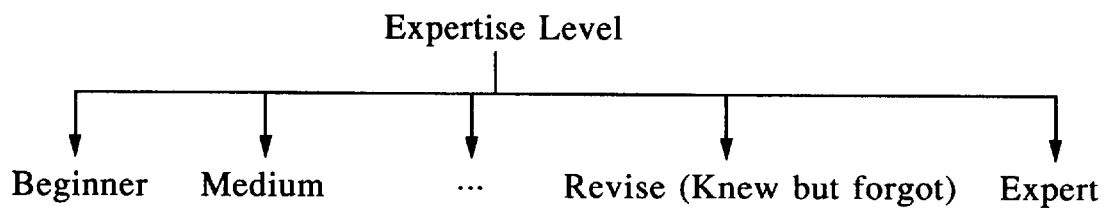
FIGS. 49(*a*), 49(*b*), 49(*c*) and 49(*d*) show an example of the attributes in the knowledge base.
Figure 49B:
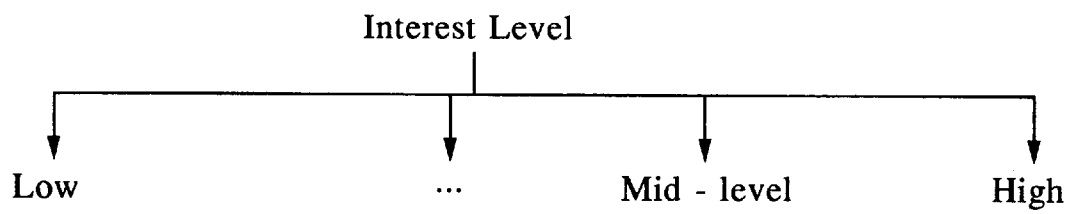
Figure 49C:
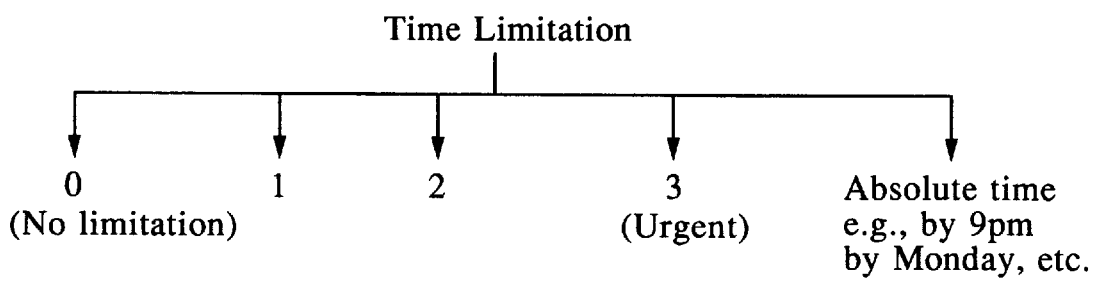
Figure 49D:
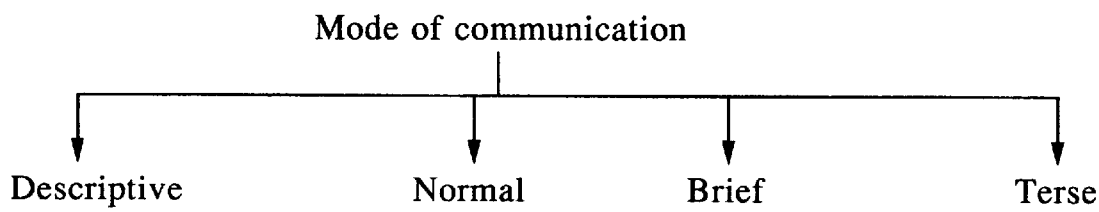
Figure 50A:
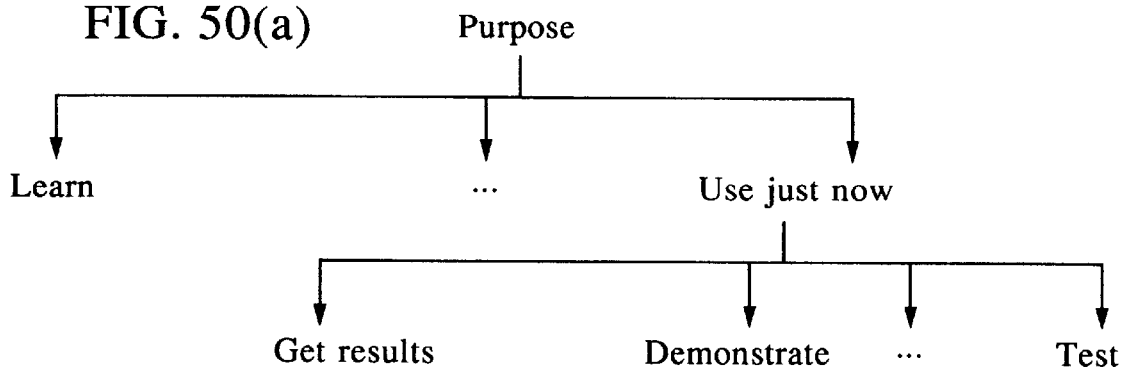
FIGS. 50(*a*), 50(*b*), 50(*c*) and 50(*d*) show an example of the attributes in the knowledge base.
Figure 50B:
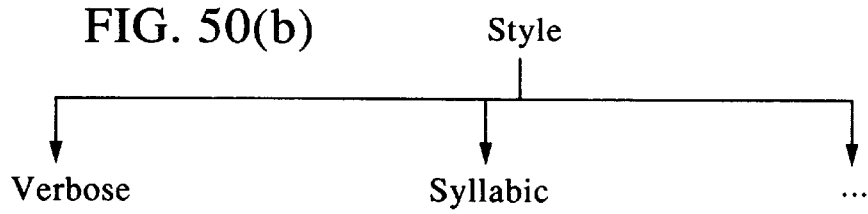
Figure 50C:
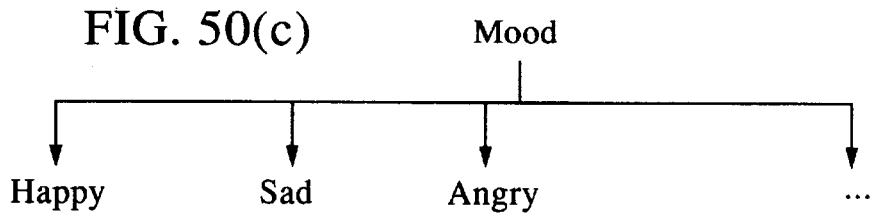
Figure 50D:
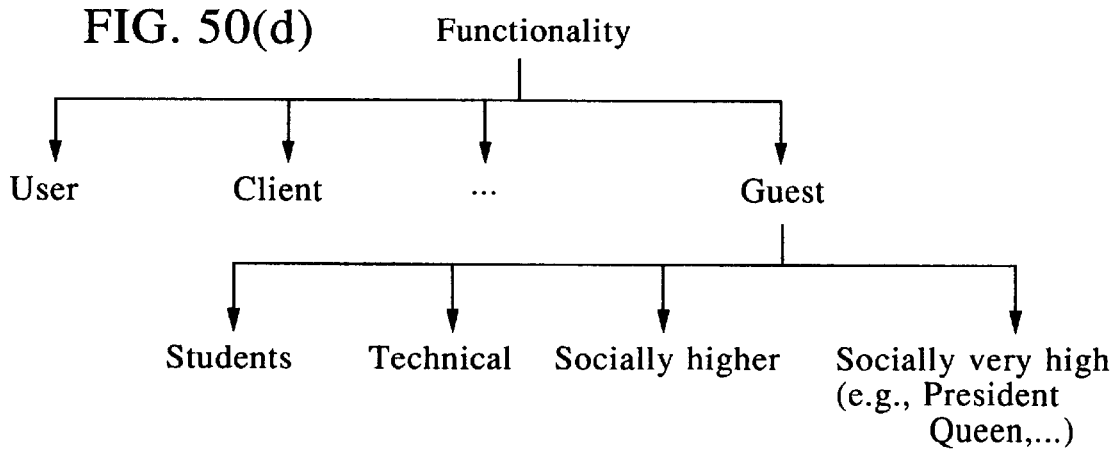

FIG. 48 is a function block diagram showing the basic components of a natural language processing system according to an embodiment of the present invention.

Referring to FIG. 48, a natural language input unit 35 is used to input information in a natural language, such as English or Japanese, from a keyboard or a voice recognizing apparatus. A concept analyzer 36 analyzes input natural language information by using knowledge of the language stored in the knowledge base 22 to output a concept corresponding to the input natural language information.

The user information processing unit 38 detects a goal (an object) of the user in accordance with input information or infers the attribute of the user, a user's goal or a plan to achieve the user's goal in accordance with input information, knowledge of the user model stored in the knowledge base 22 and the history of the user's operations. The user information processing unit 38 transmits the thus-inferred information (knowledge) to the executing unit 34. The executing unit 34 modifies the operational logic in accordance with the information about the user processed by the user information processing unit 38 to execute specified commands and the like. The result of the execution is, from the output unit 3, output via a display to the user or transmitted to another system, for example, a document preparing apparatus or output as information for controlling operating mechanisms.

Although the systems shown in FIGS. 48 and 49 have the architecture such that the history of the users operation is, as information about the user, stored in the knowledge base, history of operations, which does not correspond to the user but which concerns the current process, may be temporarily stored in the data memory to facilitate its use.

FIGS. 49 and 50 show examples of knowledge of user attributes in the knowledge base.

Part (a) of FIG. 49 shows the expertise levels in terms of the operation of the system or the like, wherein this attribute characterizes the users as beginners, experts, medium level and revise level (although the person had expertise but the he has almost lost the same due to a time lapse).

Part (b) of FIG. 49 shows the classification of interest level for objects to be low, medium and high levels. The foregoing interest level is an important factor for a system which is designed to provide help or teach something to the user. The system would use this factor to respond to the user appropriately and select the output means etc. such as to keep or increase the user's interest level for example. For example, a story may be told, a film shown or specific portions highlighted depending on the users and the situation.

Part (c) of FIG. 49 shows time limitation levels consisting of urgent, not so urgent, no limitation and the like. In accordance with the time limitation, the system simplifies the output or performs a detailed description. In addition to the fixed levels, whether or not the task must be performed urgently there may be a specific time, for example, the absolute time e.g., by 9 pm or by Monday, may be considered.

Part (d) of FIG. 49 shows modes of communication from the system to the user. In accordance with the time limitation for the task (refer to part (c)), the possible communication mode is determined to be descriptive or brief.

Part (a) of FIG. 50 shows purposes for the user to use the system which are classified into Learn, Use just now, if Use just now Get results, Test and so forth. The purpose is detected from the contents of the input or inferred from other attributes.

Part (b) of FIG. 50 shows the styles. Since persons have peculiar styles, ways of performing the process and likes and dislikes, the system takes into account the characteristics of persons to achieve efficient communication with the user. For example, a long message must be shortened for a user who likes simple and short messages. A detailed description as much as possible must be given and perhaps, also repeated checks must be made to ensure whether the user has understood the subject or not, in a case of a user who is slow or if the subject matter is new.

Part (c) of FIG. 50 shows moods. Since human beings depend upon their moods unlike machines, the system discriminates the mood of the user to perform a process in accordance with the mood of the user. For example, if the user is sad, a message for encouraging the user is output or an interesting story for the user is told (output to the user). Moreover, transmission of a message which might further depress the user, is delayed. For example, in the case of electronic mail, the messages are sorted in such an order, that except if it is not urgent, bad news is displayed as late as possible.

Part (d) of FIG. 50 shows functionality and advantages. The position/context/function of the person who is operating the system should be an important factor in the performance and response of the system. For example, the demonstration of the system operation would be different when the audiences are hopeful customers and as opposed to where the audiences are students who study by observation.

FIG. 51 shows an example of a model of a user. In this system, the model of the user includes a variety of attribute values shown in FIGS. 49 and 50, a list of tasks to be performed, previous tasks (history of operations), the purposes and plans.

Figure 52:
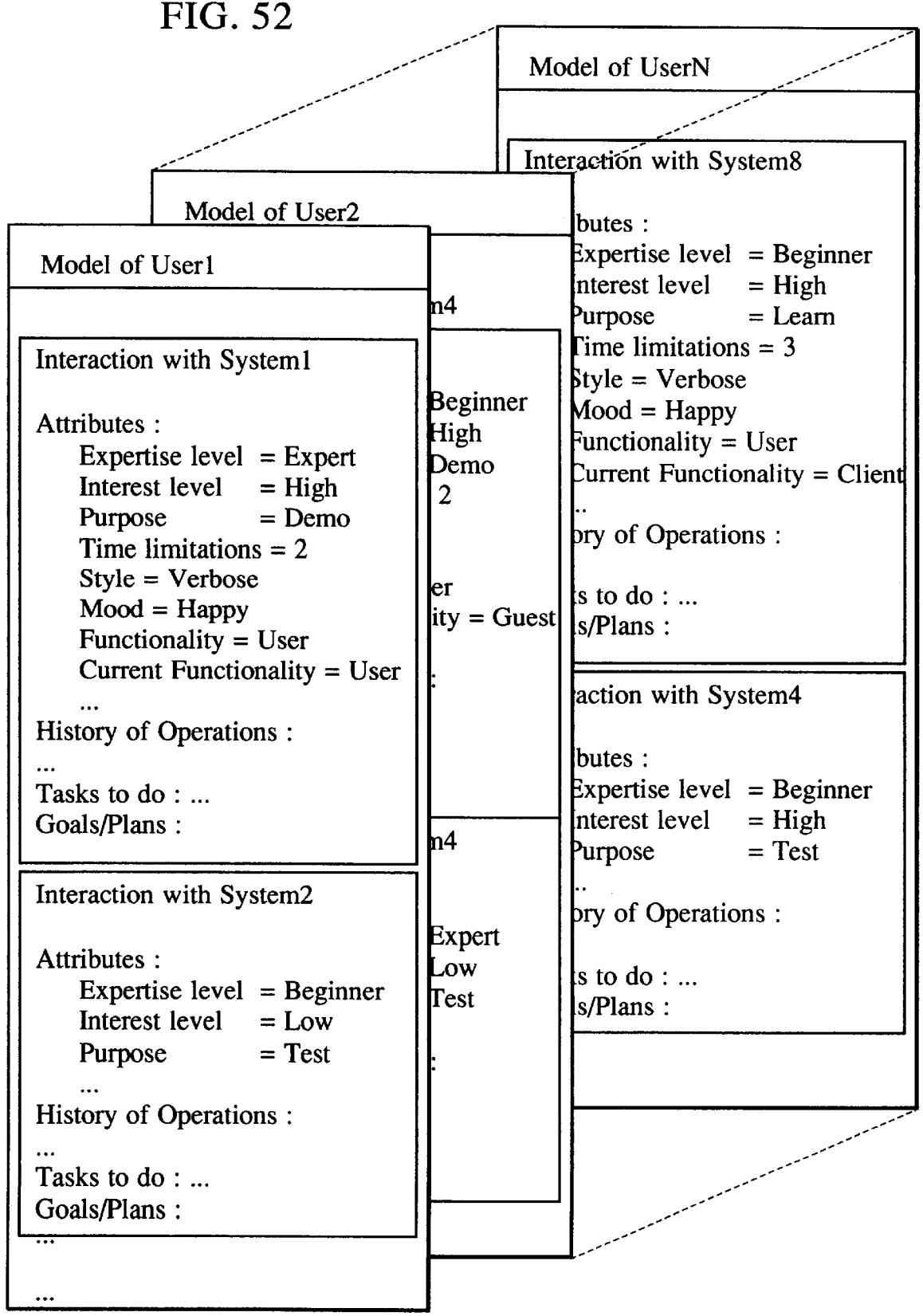
FIG. 52 shows an example of a knowledge base storing user models.

FIG. 52 shows a knowledge base which contains the knowledge of the user model shown in FIG. 51 for each user who uses the system.

FIG. 53 shows an example of a rule base classifying user's level of expertise. Using these rules, the user's expertise level, such as beginner or otherwise is inferred. In this embodiment, the rules specify that, if basic concepts are included in the query then the user must be a beginner, if intermediate concepts are included in the query then the user must be a middle level user, and if advanced concepts are included in the query then the user must be an advanced user. Another rule may be that, if concepts of multiple levels are mixed, then the user can be inferred to be of an advanced level.

FIG. 54 shows an example of a knowledge base which has knowledge about the relationship between command concepts and their levels. The knowledge base may store forms of expression as well as the words along with concepts.

An example will row be described in which the output from an office machine is changed in accordance with the situation.

In the case of a color copying machine, if the system infers that a demonstration is being performed for guests who need only to have a feel, excellent quality print is not required. However, if it is inferred that the demonstration is being made for prospective customers, a high quality output is generated. By controlling the output quality depending upon whether a draft copy or a final output is required, the cost can be reduced and time to complete the process can be shortened.

Predetermined sequential processes or fixed inputs are inferred to be demonstrations or tests. If a sequential operation procedure highlights an essential aspect of the system, it is inferred that the process is a demonstration. If input data is found to be limiting values of a function, it is inferred that the process is most likely a test by a service man.

Figure 55:
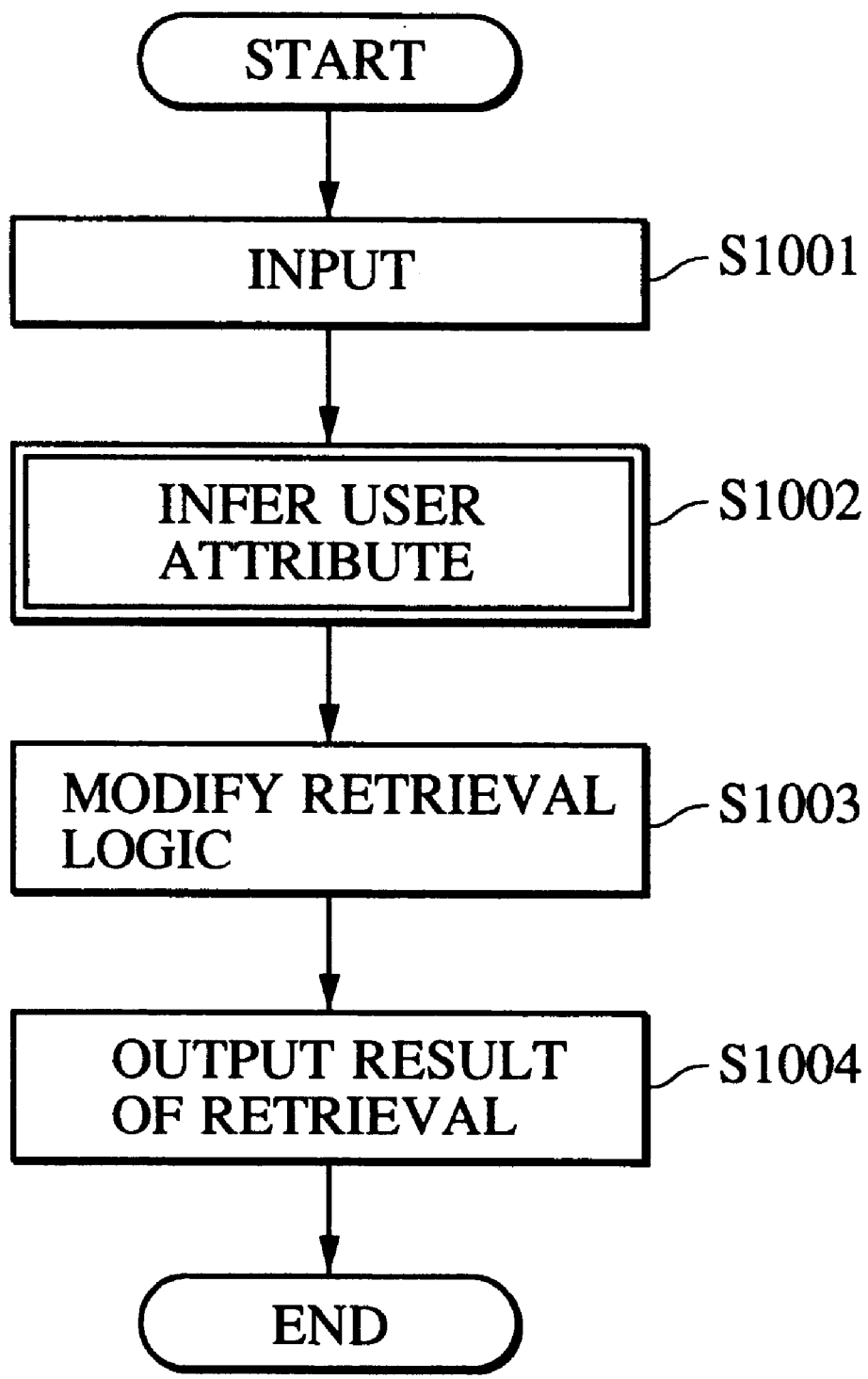
FIG. 55 is a flow chart of a process to be performed by an information retrieving system.

FIG. 55 is a flow chart of a process performed by an information retrieving system. In step S1001 information is input, and in step S1002, surrounded by double lines, the user information processing unit 38 infers the user attribute from input information and the knowledge base 22. In step S1003 inferred user attribute is used to efficiently and effectively modify the retrieval and information acquiring logics. In step S1004 retrieval is performed in accordance with the modified retrieving logic to output the result.

Figure 56:
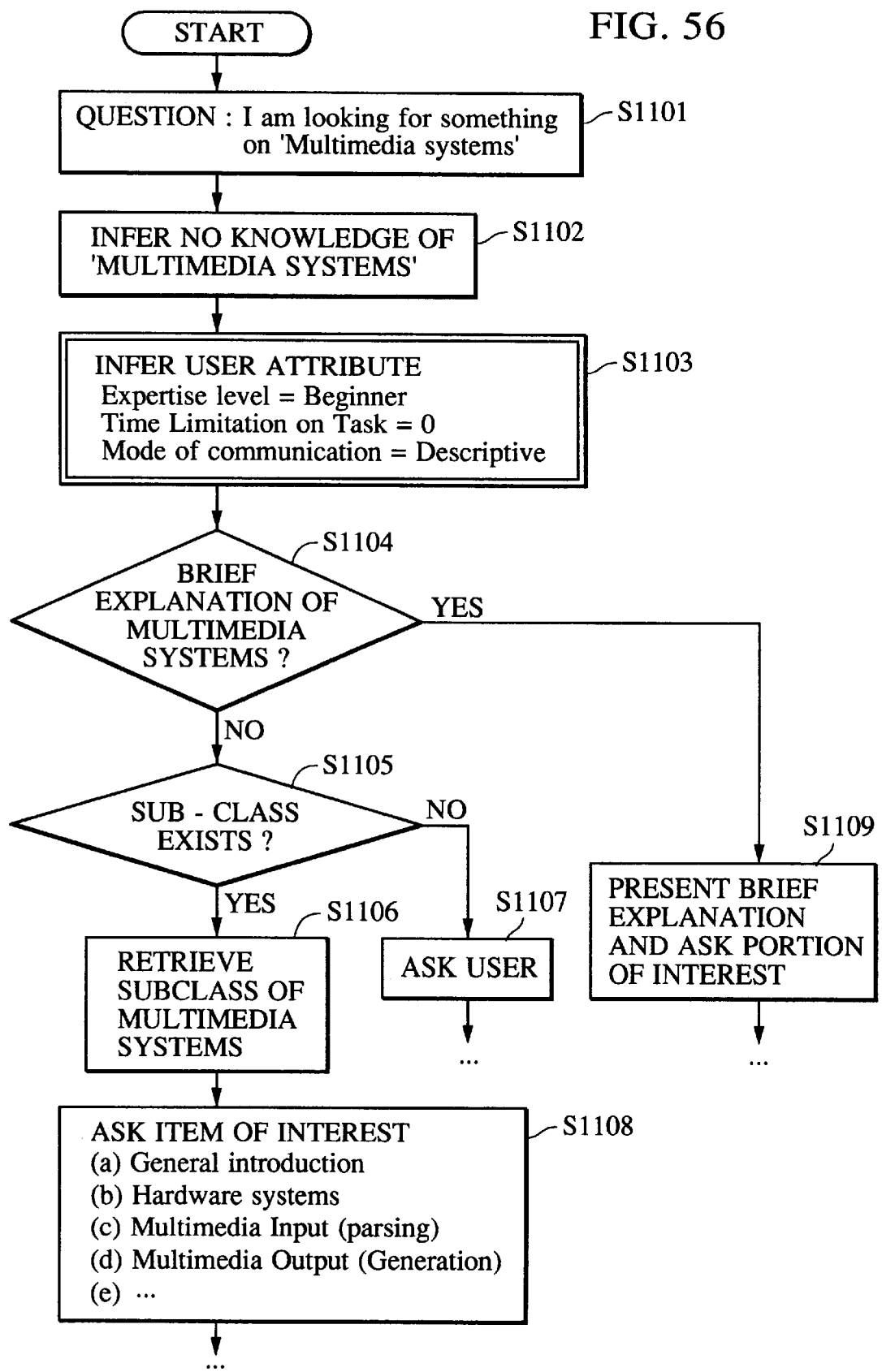
FIG. 56 is a flow chart for processing a query from a user.

FIG. 56 is a flow chart for processing an input query "I am looking for something on "Multimedia systems".

In step S1101 the foregoing query is input, then in step S1102 it is inferred that the user has no knowledge of "Multimedia systems". From the choice of expression of the query, it is inferred in step S1103 that the user is a beginner and that user's request is not urgent, and the communication mode is set to Descriptive. The foregoing factors are set as the attributes. In step S1104 the knowledge base is retrieved to search whether or not a brief description or presentation of the outline of the multimedia exists. If it exists, the description found is presented to the user and the user is queried for his interest. In accordance with the reply from the user, the process is continued.

If nothing has been found, a list of sub-classes of multimedia systems is searched for. If no sub-class list is found, the user is asked to further specify the subject to be searched, and the process is continued. If the system finds a list of sub-classes then that is retrieved in step S1106 and in step S1108 it is presented to the user for further specification.

Since it can be understood from the form of the first query that the user is not interested in obtaining the list of all information items concerning the multimedia and stored in the system, the subject to be searched can be narrowed.

Figure 57A:
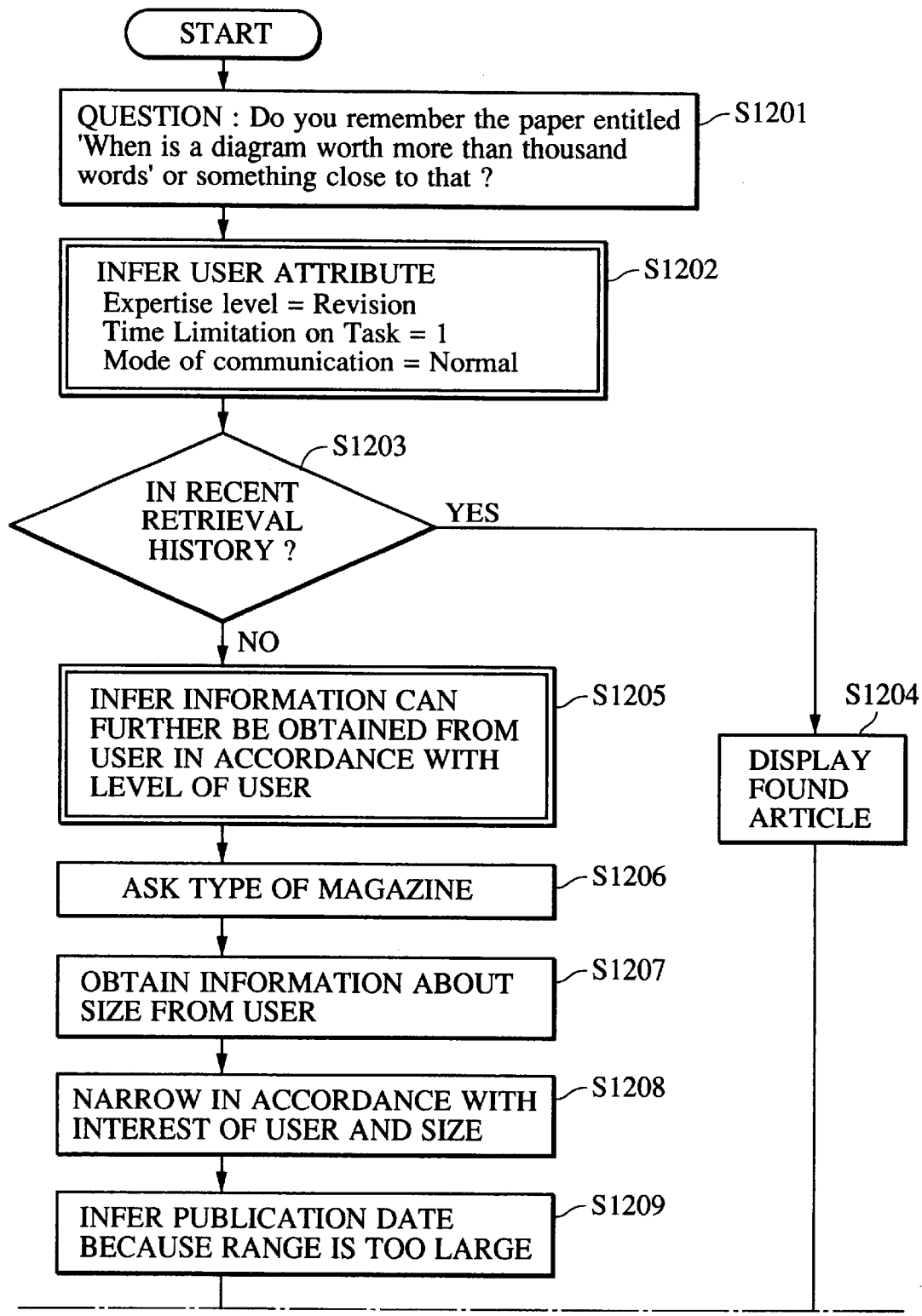

FIG. 57 is a flow of the processing if a query "Do you remember the paper entitled 'When is a diagram worth more than thousand words' or something close to that" has been input.

If the foregoing query has been input in step S1201, the system infers in accordance with the form of the query that the user has seen the article so that the level of the user is set to Revision as the attribute of the user in step S1202. In step S1203 it is searched whether the foregoing article is included in the latest retrieval history. If the article is included, the foregoing article is presented to the user in step S1204. If the article is not found, then in step S1205 it is inferred that a further hint can perhaps be obtained from the user as the user has seen the article. In step S1206 the type of the magazine is queried. An assumption is made that the information that the size of the magazine was B5 is obtained in step S1207. In step S1208 information that the field of interest of the user, for example AI, is accessed from the information about the user, and the foregoing information and the size obtained in step S1207 are used to narrow the range of possible publications to be searched. Since the range to be searched is still considered to be too wide at this point, it is inferred in step S1209 that the tire of publication should be narrowed, and this query is made to the user in step S1210. An assumption is made here that the time of publication is about end of the 1980's has been obtained in step S1211. In step S1213 the range to be researched is limited in accordance with the obtained information so that the retrieval is performed efficiently. In step S1213 the obtained result is output.

Figure 58:
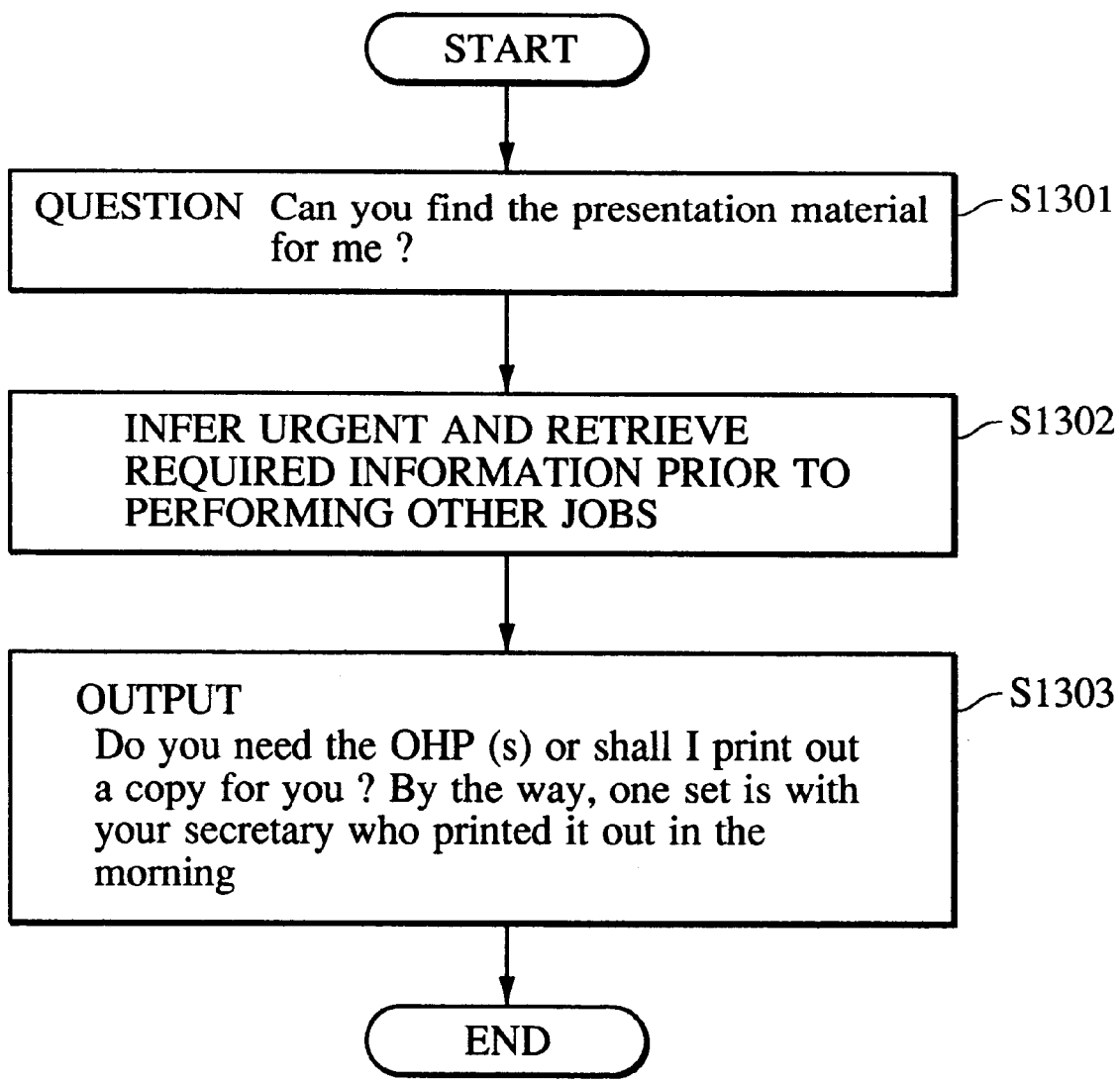
FIG. 58 is a flow chart for processing a query from a user.

FIG. 58 is a flow chart of the process when a query "Can you find the presentation material" has been input.

If the foregoing query has been input in step S1301, the system in step S1302, infers that the foregoing request is urgent in accordance with the form of the query and priority is given to this task. Thus, the foregoing case is processed prior to performing other jobs. Then, required information is efficiently retrieved. Further, it is inferred that user may not only want to see it, but also have a hard copy; also since it is presentation material, he may directly want an OHP set. In step S1303 whether an ORP is required, whether one copy bundle is printed out and the like are queried. Further, if it is known that the secretary of the user has copied the document from the history of the operations of the secretary due to retrieval of the other user models in step S1302. this fact can be notified to the user.

If the query is "Fetch the letter I wrote to John" in the form of an imperative sentence, the system infers that the process is urgent. In the foregoing case, the process is performed similarly to the flow chart shown in FIG. 58.

When the system constructs the user model for each user, the system also takes into account the style of each user in the model. If a certain user repeats inputs in the form of an imperative sentence, the system infers that the imperative input is the style of that user and the rule base is modified to that effect, so that, even if an imperative input is given by the user, the commanded task is not inferred to be an urgent task. In such a case, the user must employ another input form, for example, a form in which, for example, "I need . . . quickly" is added to the foregoing input sentence to exact the normal 'urgent task' inference from the system.

Figure 59:
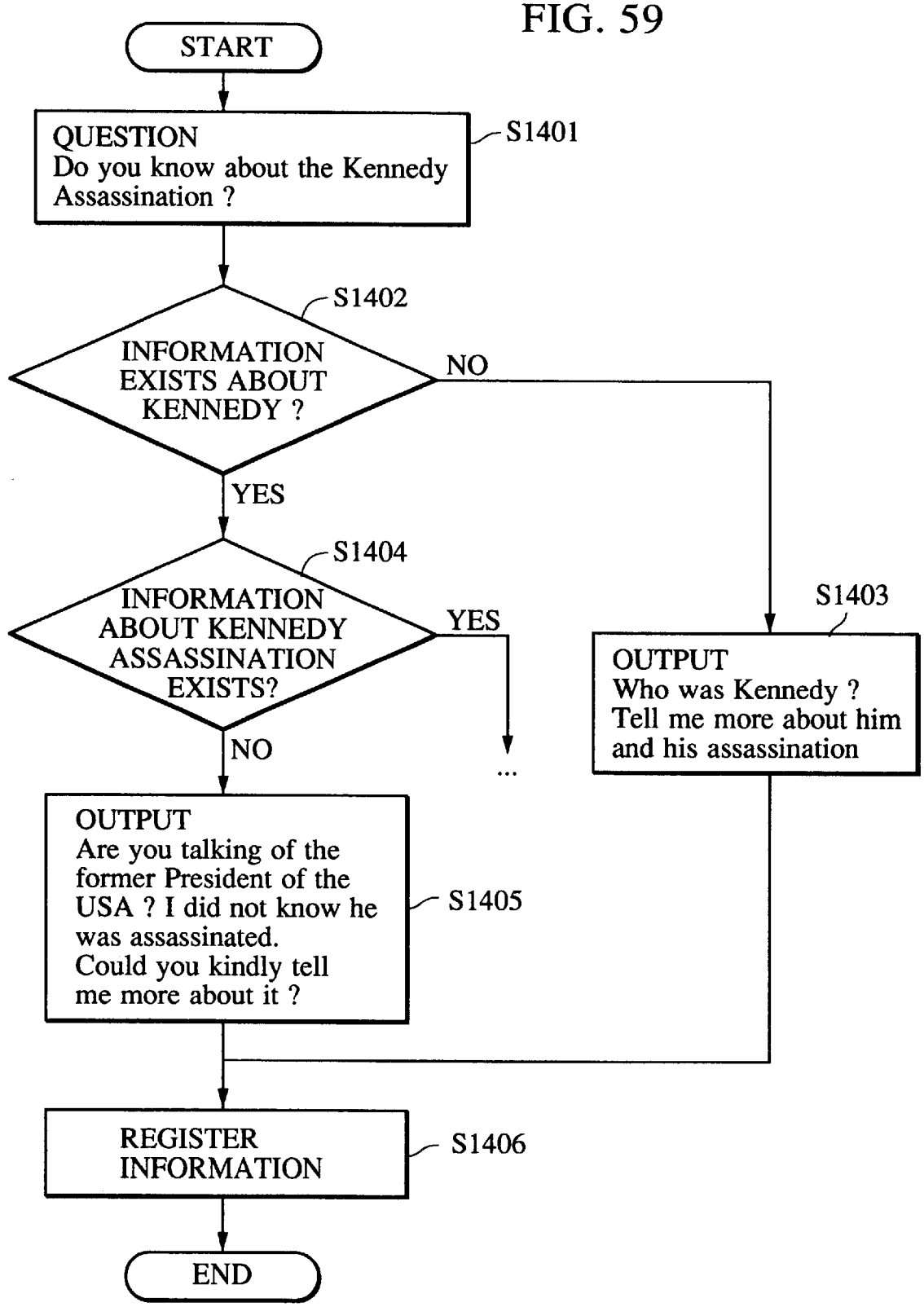
FIG. 59 is a flow chart for processing a query from a user.

FIG. 59 is a flow chart for processing a query "Do you know about Kennedy Assasination?" has been input.

If the foregoing query has been input in step S1401, the system searches for information about Kennedy in step S1402. If there is no information about Kennedy, the system displays, to the user, its ignorance of the subject and a message for requiring information about Kennedy in step S1403. Then, the operation proceeds to step S1406. If there is information about Kennedy, further information about Kennedy Assasination is searched for in step S1404. If there is no information, the system displays, to the user, a message for requiring information about Kennedy Assasination. Then, the operation proceeds to step S1406. If there is information about Kennedy Assasination, the information is presented to the user. In step S1406 the information input by the user in response to system request is stored.

Figure 60:
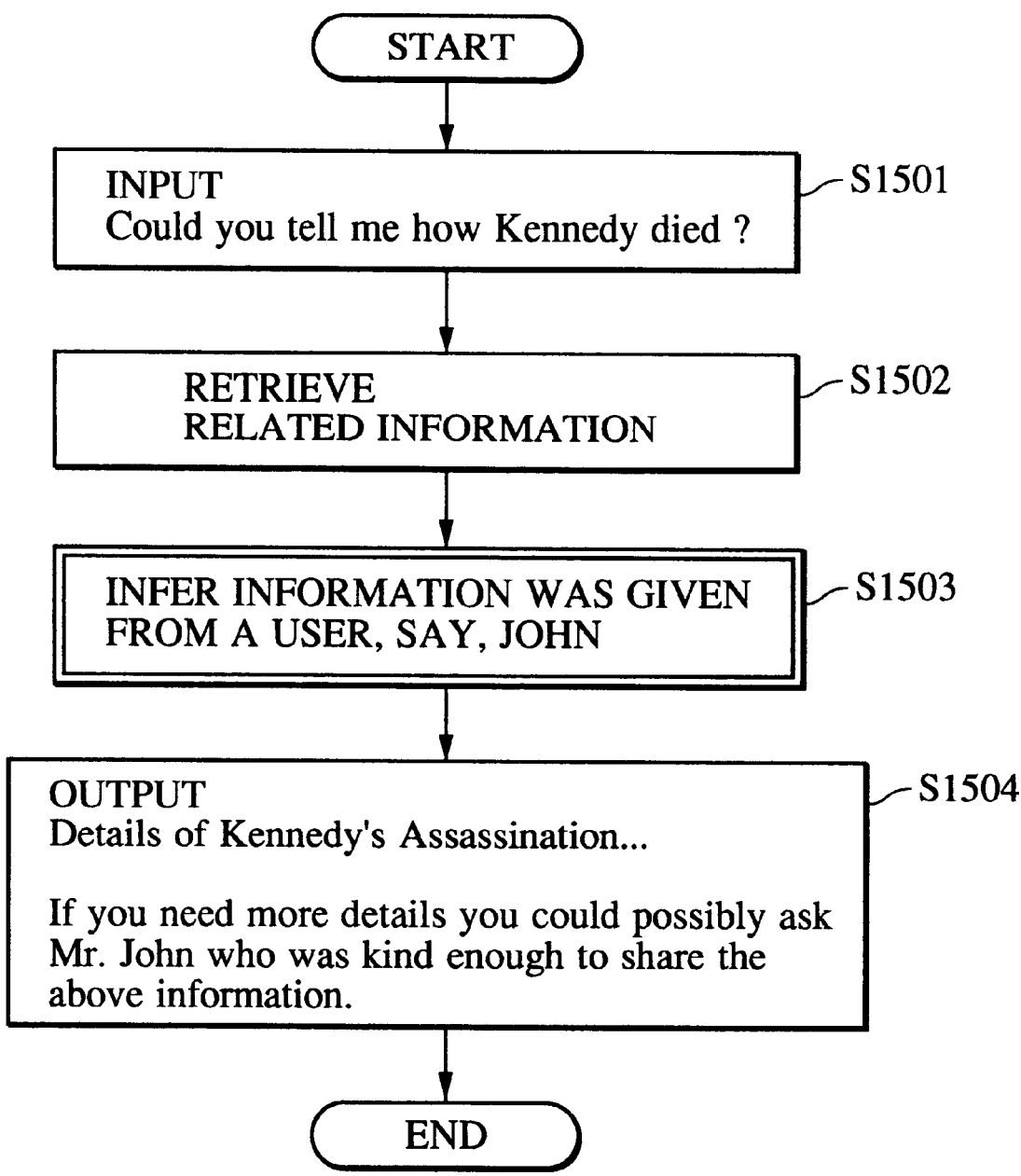
FIG. 60 is a flow chart for processing a query from a user.

FIG. 60 is a flow chart for processing in case where a query from user "Could you tell me how Kennedy died?" is input after the system has processed the query in the previous example input by another user, say John (see FIG. 59).

If the foregoing query has been input in step S1501, the system searches for requested information in step S1502. In step S1503 the system infers that John has further detailed information because the source of the searched information is John and that notification of the information source might be helpful for the user. In step S1504 the system notifies the user of the source of the information along with the information.

An example will now be described in which the level of the user is inferred and help information for a query about the programming language from the user is provided in accordance with the inferred level of the user.

FIGS. 61 and 62 show an example of a dialogue between a user and the system.

Referring to FIG. 61, in a case (1), since the sentence input by the user includes a term "file" considered belonging to a naive level concept, it is inferred in accordance with the rule shown in FIG. 8 that the user is a beginner. If a noncommittal term such as "something" is included in the foregoing input sentence which is given to be a naive level concept, a similar inference can be made. As a result of the foregoing inference, the system outputs help information for a beginner as shown in (1).

In an example shown in (2) of FIG. 61, an inference is made in accordance with the history of help information asked by the user and the knowledge of the user model of the user that user requires only syntax. As a result of the inference, an output shown in (2) is generated.

In an example shown in FIG. 62, since the sentence input by the user includes terms "binary data" and "random access" considered belonging to an advanced level concept shown in FIG. 54, it is inferred that the user is an expert (not a beginner) in accordance with the rule shown in FIG. 53. As a result of this inference, an output corresponding to the inferred user level is generated.

As described above, effective and efficient processing taking into account the level of the user, degree of urgency and the situation of each user can thus be achieved.

Thus, from the history of the system operation, parts of information processing which are common to various submodules of the system or same and/or similar processing previously executed etc. can be taken care of and according, situation sensitive information processing can be achieved.

The foregoing architecture of the present invention may be applied to a system consisting of multiple computers or a specific computer in a system. The present invention can be applied to a case where a desired process can be performed by a computer which executes a program, the program being permitted to be supplied from an external storage medium. The recording medium for storing the program is included within the scope of the present invention.

Although the invention has been described in its preferred form with a certain degree of particularity, many apparently widely different embodiments of the invention can be made without departing from the spirit and the scope thereof. It is to be understood that the invention is not limited to the specific embodiments thereof except as defined in the appended claims.

What is claimed is:

1. An information processing system for processing information, wherein a user has a goal, said information processing system is used in a present environment, and said information processing system is for processing information about an object the user uses, for detecting the user's goal in using the object by sensing how the user manually uses the object without a separate input by the user about the user's goal, and for inferring requirements to achieve the user's goal, said system comprising:

inputting means for inputting information;
   a sensor for sensing an environmental condition of the present environment around the information processing system and for sensing how the user manually uses the object; and
   safely controlling means for safely controlling the object without assistance from the user and in accordance with the user's goal without a separate input by the user about the user's goal by detecting with detecting means the user's goal in using the object by sensing with the sensor how the user manually uses the object without requiring a separate input by the user about the user's goal, wherein said safely controlling means comprises:
      a knowledge base having knowledge of environmental conditions and user goals and their requirements;

inference means for retrieving data stored in said knowledge base in accordance with the inputted information and the sensed environmental condition of the present environment to infer a requirement to achieve the user's detected goal, wherein said inference means infers the requirement also in accordance with the detected user's goal; and outputting means for outputting the inferred requirement.

2. An information processing system according to claim 1, wherein said inference means further infers a requirement whose corresponding response is the preceding inferred requirement.

3. An information processing system according to claim 1, wherein said inputting means includes selection means for selecting one of a plurality of candidates.

4. An information processing system according to claim 1, wherein said inputting means includes operation means for operating a predetermined mechanism.

5. An information processing system according to claim 1, further comprising processing means for performing a process which corresponds to the outputted requirement.

6. An information processing system according to claim 1, further comprising history storage means for storing the history of inputted information and wherein said inference means makes reference to the stored history.

7. An information processing system for processing information, wherein a user has a goal, wherein said information processing system is used in a present environment, and is for processing information about an object the user uses, for detecting the user's goal in using the object by sensing how the user manually uses the object without a separate input by the user about the user's goal, and for inferring requirements to achieve the user's goal, said system comprising:

inputting means for inputting information;

a sensor for sensing an environmental condition of the present environment around the information processing system and for sensing how the user manually uses the object; and safely controlling means for safely controlling the object without assistance from the user and in accordance with the user's goal without a separate input by the user about the user's goal by detecting the user's goal in using the object by sensing with the sensor how the user manually uses the object without requiring a separate input by the user about the user's goal, wherein said safely controlling means comprises:

a knowledge base having knowledge of environmental conditions, user goals and their requirements, responses corresponding to the requirements, plans corresponding to the requirements and results of execution of processes;

requirement inference means for retrieving data stored in said knowledge base in accordance with the inputted information and the sensed environmental condition of the present environment to infer a requirement to achieve the user's detected goal corresponding to the inputted information and the present environment, wherein said inference means infers the requirement also in accordance with the detection of the how the user uses the object;

plan construction means for constructing a plan corresponding to the inferred requirement; and predicting means for predicting a result of execution of the plan by performing a simulation of the constructed plan.

8. An information processing system according to claim 7, further comprising determining means for determining a process to be performed to prevent an undesirable result if said predicting means predicts the undesirable result.

9. An information processing system according to claim 8, further comprising executing means for executing the determined process.

10. An information processing system according to claim 7, further comprising notifying means for notifying the user of the predicted result of execution of the plan.

11. An information processing system according to claim 7, wherein said inputting means includes selection means for selecting one of a plurality of candidates.

12. An information processing system according to claim 7, wherein said inputting means includes operation means for operating a predetermined mechanism.

13. An information processing system according to claim 7, further comprising history storage means for storing the history of inputted information and wherein said inference means makes reference to the stored history.

14. An information processing method for processing information, wherein a user has a goal, said information processing method is used in a present environment, and said information processing method is for processing information about an object a user uses, for detecting the user's goal in using the object by sensing how the user manually uses the object without a separate input by the user about the user's goal, and for inferring requirements to achieve the user's goal, said method comprising the steps of:

inputting information into an information processing system;

sensing an environmental condition of the present environment around the information processing system with a sensor and for sensing how the user manually uses the object; and safely controlling the object without assistance from the user and in accordance with the user's goal without a separate input by the user about the user's goal by detecting the user's goal in using the object by sensing with said sensing step how the user manually uses the object without requiring a separate input by the user about the user's goal, wherein said controlling step comprises the steps of:

inferring a requirement for achieving the user's detected goal by retrieving data stored in a knowledge base having knowledge of requirements for user goals in accordance with the inputted information and the sensed environmental condition, wherein said inferring step infers the requirement also in accordance with the detection of the how the user uses the object; and outputting the inferred requirement.

15. An information processing method according to claim 14, wherein said inference step further infers a requirement whose corresponding response is the preceding requirement obtained from the inference.

16. An information processing method according to claim 14, wherein said inputting step includes a selection step for selecting one of a plurality of candidates.

17. An information processing method according to claim 14, wherein said inputting step includes an operation step for operating a predetermined mechanism.

18. An information processing method according to claim 14, further comprising a processing step for executing a process which corresponds to a requirement output from said outputting step.

19. An information processing method for processing information, wherein a user has a goal, said information processing method is used in a present environment, and said information processing method is for processing information about an object the user uses, for detecting the user's goal in using the object by sensing how the user manually uses the object without a separate input by the user about the user's goal, and for inferring requirements to achieve the user's goal, said method comprising the steps of:

inputting information into an information processing system;

sensing an environmental condition of the present environment around the information processing system with a sensor and for sensing how the user manually uses the object; and safely controlling the object without assistance from the user and in accordance with the user's goal without a separate input by the user about the user's goal by detecting the user's goal in using the object by sensing with said sensing step how the user manually uses the object without requiring a separate input by the user about the user's goal, said controlling step comprising the steps of:

inferring a requirement for achieving the user's goal by retrieving, in accordance with the inputted information and the environmental condition of the present environment sensed in said sensing step with the sensor, data stored in a knowledge base having knowledge of requirements of user goals, responses corresponding to the requirements, and plans corresponding to the requirements so as to infer a requirement for achieving the user's goal corresponding to the information and the present environment, wherein said requirement inference step infers the requirement also in accordance with the detection of the how the user uses the object;

constructing a plan corresponding to the requirement; and predicting a result of execution of the plan by performing a simulation of the constructed plan.

20. An information processing method according to claim 19, further comprising a determining step for determining a process to be performed to prevent an undesirable result if the undesirable result has been predicted in said predicting step.

21. An information processing method according to claim 20, further comprising an executing step for executing the process determined in said determining step.

22. An information processing method according to claim 19, further comprising a notifying step for notifying the user of the predicted result of execution of the plan.

23. An information processing method according to claim 19, wherein said inputting step includes a selection step for selecting one of a plurality of candidates.

24. An information processing method according to claim 19, wherein said inputting step includes an operating step for operating a predetermined mechanism.

25. An information processing method according to claim 19, further comprising a history storage step for storing the history of inputted information and wherein said inference step makes reference to the history stored in said history storage step.

26. A computer readable storage medium storing a program for instructing a computer to perform an information processing method, wherein a user has a goal, said information processing method is used in a present environment for processing information about an object the user uses, for detecting the user's goal in using the object by sensing how the user manually uses the object without a separate input by the user about the user's goal, and for inferring requirements to achieve the user's goal, said program instructing the computer to perform the following steps:

receiving information input into the computer;

sensing an environmental condition of the present environment around the computer with a sensor and sensing how the user manually uses the object; and safely controlling the object without assistance from the user and in accordance with the user's goal without a separate input by the user about the user's goal by detecting the user's goal in using the object by sensing with said sensing step how the user manually uses the object without requiring a separate input by the user about the user's goal, said controlling step comprising the steps of:

inferring requirements to achieve the user's detected goal by retrieving data stored in a knowledge base having knowledge of user goals, requirements corresponding to the goals in accordance with the received information and the sensed environmental condition, wherein said inferring step infers the requirements also in accordance with the detection of the how the user uses the object; and an outputting step for outputting the inferred requirements.

27. A computer readable storage medium storing a program for instructing a computer to perform an information processing method for processing information, wherein a user has a goal, wherein said information processing method is used in a present environment for processing information about an object the user uses, for detecting the user's goal in using the object by sensing how the user manually uses the object without a separate input by the user about the user's goals, and for inferring requirements to achieve the user's goal, said program instructing the computer to perform the following steps:

receiving information into the computer;

sensing an environmental condition of the present environment around the computer with a sensor and sensing how the user manually uses the object; and safely controlling the object without assistance from the user and in accordance with the user's goal without a separate input by the user about the user's goal by detecting the user's goal in using the object by sensing with said sensing step how the user manually uses the object without requiring a separate input by the user about the user's goal, said controlling step comprising the steps of:

inferring a requirement to achieve the user's goal by retrieving data in accordance with the received information and the sensed environmental condition, the data being stored in a knowledge base having knowledge of user goals, requirements of the goals, responses corresponding to the requirements, and plans corresponding to the requirements, so as to infer a requirement for achieving the user's goal corresponding to the received information and the present environment, wherein said requirement inference step infers the requirement also in accordance with the detection of the how the user uses the object;

constructing a plan corresponding to the requirement; and predicting a result of execution of the constructed plan by performing a simulation of the constructed plan.

* * * * *

UNITED STATES PATENT AND TRADEMARK OFFICE
CERTIFICATE OF CORRECTION

PATENT NO. : 6,578,019 B1
DATED : June 10, 2003
INVENTOR(S) : Aruna Rohra Suda et al.

It is certified that error appears in the above-identified patent and that said Letters Patent is hereby corrected as shown below:

Title page,
Item [56], OTHER PUBLICATIONS, "M. Smith, et et al.;" should read
-- M. Smith, et al.; --.
"Durharm, NH NH," should read -- Durharm, NH, --.

Drawings,
Sheet No. 22, Figure 22, "agein," should read -- again, --.
Sheet No. 44, Figure 44, "(type-Wordprocess))..}" should read
-- type-Wordprocessor))..} --.

Column 4,
Line 12, "a u a" should read -- a user; a --.
Line 41, "bass" should read -- base --.

Column 7,
Line 23, "FIG. 1." should read -- FIG. 1, --.

Column 9,
Line 28, "university," should read -- University, --.
Line 41, "in" should read -- is --.

Column 10,
Line 22, "of d" should read -- of a --.
Line 61, "is command," should read -- command, --.

Column 11,
Line 2, "system,"" should read -- system." --.
Line 11, "Rohra" should read -- Aruna Rohra --.

Column 12,
Line 3, "been." should read -- been --.
Line 42, "case" should read -- case. --.
Line 59, "tile" should read -- file --.

Column 13,
Line 19, "Tn" should read -- In --.

Column 14,
Line 11, "codes." should read -- code. --.
Line 12, "stores the." should read -- stores the --.

UNITED STATES PATENT AND TRADEMARK OFFICE
CERTIFICATE OF CORRECTION

PATENT NO. : 6,578,019 B1
DATED : June 10, 2003
INVENTOR(S) : Aruna Rohra Suda et al.

It is certified that error appears in the above-identified patent and that said Letters Patent is hereby corrected as shown below:

Column 14, (cont.)
Line 26, "then" should read -- the --.
Line 33, "means" should read -- mean --.
Line 49, "Kata-" should read -- Katakana" --.
Line 50, "kana."" should be deleted.
Line 65, "goals;" should read -- goals --.

Column 16,
Line 25, "users" should read -- user's --.
Line 35, "but the" should read -- but --.

Column 17,
Line 49, "row" should read -- now --.

Column 18,
Line 55, "tire" should read -- time --.

Column 19,
Line 7, "ORP" should read -- OHP --.

Column 21,
Line 62, "of the how" should read -- of how --.

Signed and Sealed this

Sixth Day of April, 2004

JON W. DUDAS
*Acting Director of the United States Patent and Trademark Office*